US012718823B2

(12) United States Patent
Norvell et al.

(10) Patent No.: US 12,718,823 B2
(45) **Date of Patent: *Aug. 25, 2026**

(54) METHOD AND APPARATUS FOR CONTROLLING MULTICHANNEL AUDIO FRAME LOSS CONCEALMENT

(71) Applicant: Telefonaktiebolaget LM Ericsson (publ), Stockholm (SE)

(72) Inventors: Erik Norvell, Upplands Väsby (SE); Chamran Moradi Ashour, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 252 days.

This patent is subject to a terminal disclaimer.

(21) Appl. No.: 18/638,536

(22) Filed: Apr. 17, 2024

(65) Prior Publication Data

US 2024/0274135 A1 Aug. 15, 2024

Related U.S. Application Data

(63) Continuation of application No. 17/414,585, filed as application No. PCT/EP2019/062570 on May 16, 2019, now Pat. No. 11,990,141.

(Continued)

(51) Int. Cl.
*G10L 19/008* (2013.01)
*G10L 19/005* (2013.01)

(52) U.S. Cl.
CPC .......... *G10L 19/005* (2013.01); *G10L 19/008* (2013.01); *H04R 2420/03* (2013.01)

(58) Field of Classification Search
CPC ... G10L 19/005; G10L 19/008; G10L 19/007; G10L 19/20; H04S 2420/03

(Continued)

(56) References Cited

U.S. PATENT DOCUMENTS 7,117,423 B2 10/2006 Kim et al.
8,374,856 B2 * 2/2013 Kim ...................... G10L 19/005 704/207

(Continued)

FOREIGN PATENT DOCUMENTS

CN 104885149 A 9/2015
CN 105378834 A 3/2016

(Continued)

OTHER PUBLICATIONS

International Search Report and Written Opinion of the International Searching Authority, PCT/EP2019/062570, mailed Aug. 28, 2019, 9 pages.

(Continued)

*Primary Examiner* — Disler Paul
(74) *Attorney, Agent, or Firm* — Sage Patent Group

(57) ABSTRACT

A method of approximating a lost or corrupted multichannel audio frame of a multichannel audio signal in a decoding device is provided. The device may generate a down-mix error concealment frame and transform the frame into a frequency domain to generate a transformed down-mix error concealment frame. The device may decorrelate the transformed frame to generate a decorrelated concealment frame. The device may obtain a residual signal spectrum of a stored residual signal of a previously received multichannel audio signal frame and generate an energy adjusted decorrelated residual signal concealment frame using the residual signal spectrum. The device may obtain a set of multi-channel audio substitution parameters and provide the frames and substitution parameters to an audio synthesis component to generate a synthesized multichannel audio frame. The device performs an inverse frequency domain transformation of the audio frame to generate a substitution frame for the lost or corrupted audio frame.

21 Claims, 15 Drawing Sheets

Related U.S. Application Data

(60) Provisional application No. 62/782,453, filed on Dec. 20, 2018.

(58) Field of Classification Search
USPC .......................................................... 381/22
See application file for complete search history.

(56) References Cited

U.S. PATENT DOCUMENTS

| | | | | |
|---|---|---|---|---|
| 8,386,246 | B2 * | 2/2013 | Chen | G10L 19/005 704/211 |
| 9,263,050 | B2 | 2/2016 | Daniel | |
| 9,368,122 | B2 | 6/2016 | Kuntz | |
| 9,424,851 | B2 * | 8/2016 | Sung | G10L 19/167 |
| 9,877,132 | B2 * | 1/2018 | Engdegard | H04H 40/45 |
| 10,140,994 | B2 | 11/2018 | Sung et al. | |
| 10,224,040 | B2 | 3/2019 | Huang et al. | |
| 10,290,308 | B2 | 5/2019 | Lecomte | |
| 10,332,528 | B2 | 6/2019 | Bruhn et al. | |
| 10,839,812 | B2 * | 11/2020 | Dick | G10L 19/008 |
| 10,878,830 | B2 | 12/2020 | Lecomte | |
| 11,381,925 | B2 * | 7/2022 | Disch | G10L 19/265 |
| 2016/0142845 | A1 | 5/2016 | Dick et al. | |

FOREIGN PATENT DOCUMENTS

| | | |
|---|---|---|
| CN | 105793924 A | 7/2016 |
| CN | 107360166 A | 11/2017 |
| CN | 108899038 A | 11/2018 |
| WO | 2014051964 A1 | 4/2014 |

OTHER PUBLICATIONS

Bruhn, S., et al., "A Novel Sinusoidal Approach To Audio Signal Frame Loss Concealment And Its Application In The New EVS Codec Standard," IEEE International Conference on Acoustics, Speech And Signal Processing (ICASSP), Apr. 19, 2015 (XP033187741) pp. 5142-5146.

Breebaart, J., et al., "Background, Concept, and Architecture for the Recent MGEP Surround Standard on Multichannel Audio Compression," J. Audio Eng. Soc., vol. 55, No. 5, May 2007 (XP040508249) pp. 331-351.

Digital Cellular Telecommunications System (Phase 2+) (GSM); Universal Mobile Telecommunications System (UMTS); LTE; Audio Codec Processing Functions; Extended Adaptive Multi-Rate—Wideband (AMR-WB+) Codec; Transcoding Functions (3GPP TS 26.290 Version 15.0.0 Release 15) ETSI Technical Specification, European Telecommunications Standards Institute (ETSI), Sophia-Antipolis, France, Jul. 4, 2018 (XP014329844) pp. 1-86.

3rd Generation Partnership Project; Technical Specification Group Services and System Aspects; Codec for Enhanced Voice Services (EVS); Error Concealment of Lost Packets (Release 12) 3GPP TS 26.447 V12.7.0 (Jun. 2017) 82 pages.

Breebaart, et al., "MPEG Spatial Audio Coding/MPEG Surround: Overview and Current status" Audio Engineering Society, Convention Paper, Presented at the 119th Convention, Oct. 7-10, 2005, New York, NY, 17 pages.

Faller, C. "Parametric Multichannel Audio Coding: Synthesis of Coherence Cues" IEEE Transactions on Audio, Speech, and Language processing, vol. 14. No. 1, Jan. 2006, pp. 299-310.

Leomte,J. et al., "Packet-Loss Concealment Technology Advances in EVS" IEEE ICASSP 2015, pp. 5708-5712.

Vaillancourt, et al., "Efficient Frame Erasure Concealment in Predictive Speech Codecs Using Glottal Pulse Resynchronisation" IEEE ICASSP 2007, pp. IV-1113-IV-1116.

Examination Report mailed Mar. 7, 2022 for Indian Patent Application No. 202147032048, 6 pages.

Chinese First Office Action dated Dec. 4, 2023 for Chinese Patent Application No. 201980084864.7, 10 pages.

* cited by examiner

METHOD AND APPARATUS FOR CONTROLLING MULTICHANNEL AUDIO FRAME LOSS CONCEALMENT

CROSS REFERENCE TO RELATED APPLICATIONS

This application is a Continuation of U.S. patent application Ser. No. 17/414,585, filed on Jun. 16, 2021, which is a 35 U.S.C. § 371 National Stage Application of PCT International Application No. PCT/EP2019/062570 filed on May 16, 2019, which in turn claims domestic priority to U.S. Provisional Patent Application No. 62/782,453, filed on Dec. 20, 2018, the disclosures and content of which are incorporated by reference herein in their entirety.

TECHNICAL FIELD

The application relates to methods and apparatuses for controlling a packet loss concealment for stereo or multi-channel audio encoding and decoding.

BACKGROUND

Although the capacity in telecommunication networks is continuously increasing, it is still of great interest to limit the required bandwidth per communication channel. In mobile networks smaller transmission bandwidths for each call yields lower power consumption in both the mobile device and the base station. This translates to energy and cost saving for the mobile operator, while the end user will experience prolonged battery life and increased talk-time. Further, with less consumed bandwidth per user, the mobile network can service a larger number of users in parallel.

Through modern music playback systems and movie theaters most listeners are accustomed to high quality immersive audio. In mobile telecommunication services, the constraints on radio resources and processing delay have kept the quality at a lower level and most voice services still deliver only monaural sound. Recently, stereo and multi-channel sound for communication services has gained momentum in the context of Virtual/Mixed/Augmented Reality which requires immersive sound reproduction beyond mono. To render high quality spatial sound within the bandwidth constraints of a telecommunication network still presents a challenge. In addition, the sound reproduction also needs to cope with varying channel conditions where occasional data packets may be lost due to e.g. network congestion or poor cell coverage.

In a typical stereo recording the channel pair shows a high degree of similarity, or correlation. Some embodiments of stereo coding schemes [1] may exploit this correlation by employing parametric coding, where a single channel is encoded with high quality and complemented with a parametric description that allows reconstruction of the full stereo image. The process of reducing the channel pair into a single channel is often called a down-mix and the resulting channel is often called the down-mix channel. The down-mix procedure typically tries to maintain the energy by aligning inter-channel time differences (ITD) and inter-channel phase differences (IPD) before mixing the channels. To maintain the energy balance of the input signal, the inter-channel level difference (ILD) may also be measured. The ITD, IPD and ILD are then encoded and may be used in a reversed up-mix procedure when reconstructing the stereo channel pair at a decoder. The ITD, IPD, and ILD parameters describe the correlated components of the channel pair, while a stereo channel pair may also include a non-correlated component which cannot be reconstructed from the down-mix. This non-correlated component may be represented with an inter-channel coherence parameter (ICC). The non-correlated component may be synthesized at a stereo decoder by running the decoded down-mix channel through a decorrelator filter, which outputs a signal which has low correlation with the decoded down-mix. The strength of the decorrelated component may be controlled with the ICC parameter.

While the parametric stereo reproduction gives good quality at low bitrates, the quality tends to saturate for increasing bitrates due to the limitation of the parametric model. To overcome this issue, the non-correlated component can be encoded. This encoding is achieved by simulating the stereo reconstruction in the encoder and subtracting the reconstructed signal from the input channel, producing a residual signal. If the down-mix transformation is revertible, the residual signal can be represented by only a single channel for the stereo channel case. Typically, the residual signal encoding is targeted to the lower frequencies which are psycho-acoustically more relevant while the higher frequencies can be synthesized with the decorrelator method. FIG. 2 is a block diagram depicting an embodiment of a conventional setup for a parametric stereo codec including a residual coder. In FIG. 2, the encoder receives input signals, performs the processing described above in the stereo processing and down-mix block 210, encodes the mono output via mono encoder 220, encodes the residual signal via residual encoder 230, and encodes the ITD, IPD, ILD, and ICC parameters. The decoder receives the encoded mono output, the encoded residual signal, and the encoded parameters. The decoder decodes the residual signal via residual decoder 250 and decodes the mono signal via mono decoder 260. The parametric synthesis block 270 receives the decoded mono signal and the decoded residual signal and based on the parameters, outputs stereo channels CH1 and CH2.

Similar principles apply for multichannel audio such as 5.1 and 7.1.4, and spatial audio representations such as Ambisonics or Spatial Audio Object Coding. The number of channels can be reduced by exploiting the correlation between the channels and bundling the reduced channel set with metadata or parameters for channel reconstruction or spatial audio rendering at the decoder.

To overcome the problem of transmission errors and lost packages, telecommunication services make use of Packet Loss Concealment (PLC) techniques. In the case that data packets are lost or corrupted due to poor connection, network congestion, etc., the missing information of lost or corrupt data packets in the receiver side may be substituted by the decoder with a synthetic signal to conceal the lost or corrupt data packet. Some embodiments of PLC techniques are often tied closely to the decoder, where the internal states can be used to produce a signal continuation or extrapolation to cover the packet loss. For a multi-mode codec having several operating modes for different signal types, there are often several PLC technologies that can be implemented to handle the concealment of the lost or corrupt data packet.

For linear prediction (LP) based speech coding modes, a technique that may be used is based on adjustment of glottal pulse positions using estimated end-of-frame pitch information and replication of pitch cycle of the previous frame [2]. The gain of the long-term predictor (LTP) converges to zero with the speed depending on the number of consecutive lost frames and the stability of the last good frame [2]. Frequency domain (FD) based coding modes are typically designed to handle general or complex signals such as music. For such signals, different techniques may be used depending on the characteristics of the last received frame. Such analysis may include the number of detected tonal components and periodicity of the signal. If the frame loss occurs during a highly periodic signal such as active speech or single instrumental music, a time domain PLC similar to the LP based PLC may be suitable for implementation. In this case the FD PLC may mimic an LP decoder by estimating LP parameters and an excitation signal based on the last received frame [2]. In case the lost frame occurs during a non-periodic or noise-like signal, the last received frame may be repeated in spectral domain where the coefficients are multiplied to a random sign signal to reduce the metallic sound of a repeated signal. For a stationary tonal signal, it has been found advantageous in some embodiments to use an approach based on prediction and extrapolation of the detected tonal components. More details about the above-described techniques can be found in [2].

One concealment method operating in the frequency domain is the Phase ECU [3]. It can be implemented as a stand-alone tool operating on a buffer of the previously decoded and reconstructed time signal. Its framework is based on a sinusoidal analysis and synthesis paradigm. In this technique, the sinusoid components of the last good frame are extracted and phase shifted. When a frame is lost, the sinusoid frequencies are obtained in DFT domain from the past decoded synthesis. First the corresponding frequency bins are identified by finding the peaks of the magnitude spectrum plane. Then, fractional frequencies of the peaks are estimated using peak frequency bins. The peak frequency bins and corresponding fractional frequencies may be stored for use in creating a substitute for a lost frame. The frequency bins corresponding to the peaks along with the neighbors are phase shifted using fractional frequencies. For the remaining frequency bins of the frame, the magnitude of the past synthesis is retained while the phase may be randomized. The burst error may also be handled such that the estimated signal can be smoothly muted by converging it to zero. More detail of Phase ECU can be found in [3].

There are many different terms used for the packet loss concealment techniques, including Frame Error Concealment (FEC), Frame Loss Concealment (FLC), and Error Concealment Unit (ECU).

The PLC techniques described above are techniques designed for single-channel audio codecs. For a stereo or multi-channel decoder, one solution for error concealment may be to apply any of the above described PLC techniques on each channel. However, this solution does not provide any control of the spatial characteristics of the signal. It is likely the use of this solution will create non-correlated signals, which would give a stereo or multi-channel output that sounds unnatural or too wide. For the stereo case depicted in FIG. 2, this translates to using a single channel PLC separately on the down-mix signal and on the residual signal component.

Error concealment of the residual signal component may be particularly sensitive, since the residual component may be added to the side signal which is spatially unmasked. Discontinuities result in dramatic changes in character of the side signal and are therefore easily detected and found to be disturbing when heard.

SUMMARY

According to some embodiments of inventive concepts, a method is provided to approximate a lost or corrupted multichannel audio frame of a received multichannel audio signal in a decoding device. The method includes generating a down-mix error concealment frame and transforming the down-mix error concealment frame into a frequency domain to generate a transformed down-mix error concealment frame The method further includes decorrelating the transformed down-mix concealment frame to generate a decorrelated concealment frame. The method further includes obtaining a residual signal spectrum of a stored residual signal of a previously received multichannel audio signal. The method further includes generating an energy adjusted decorrelated residual signal concealment frame using the residual signal spectrum and providing the transformed down-mix error concealment frame, the energy-adjusted decorrelated residual concealment frame, and multi-channel audio parameters from the previously received multichannel audio signal frame to a parametric multi-channel audio synthesis component to generate a synthesized multichannel audio frame. The method further includes performing an inverse frequency domain transformation of the synthesized multichannel audio frame to generate a substitution frame for the lost or corrupted multichannel audio frame.

A potential advantage of combining the phase evolution error concealment method for the peaks of the spectrum with a noise spectrum coming from the error concealed down-mix signal passed through a decorrelator, is that the operation avoids discontinuities in the periodic signal components by phase adjusting the peaks. Moreover, the noise spectrum keeps the desired relation to the down-mix signal, e.g. the desired level of correlation. Another potential advantage is that the operation keeps the energy level of the residual signal at a stable level during frame loss.

According to other embodiments of inventive concepts, an apparatus configured to approximate a lost or corrupted multichannel audio frame of a received multichannel audio signal. The apparatus includes at least one processor and memory communicatively coupled to the processor, said memory comprising instructions executable by the processor, which cause the processor to perform operations. The operations include generating a down-mix error concealment frame and transforming the down-mix error concealment frame into a frequency domain to generate a transformed down-mix error concealment frame The operations further include decorrelating the transformed down-mix concealment frame to generate a decorrelated concealment frame. The operations further include obtaining a residual signal spectrum of a stored residual signal of a previously received multichannel audio signal. The operations further include generating an energy adjusted decorrelated residual signal concealment frame using the residual signal spectrum and providing the transformed down-mix error concealment frame, the energy-adjusted decorrelated residual concealment frame, and multi-channel audio parameters from the previously received multichannel audio signal frame to a parametric multi-channel audio synthesis component to generate a synthesized multichannel audio frame. The operations further include performing an inverse frequency domain transformation of the synthesized multichannel audio frame to generate a substitution frame for the lost or corrupted multichannel audio frame.

According to other embodiments of inventive concepts, a decoder is configured to perform operations. The operations include generating a down-mix error concealment frame and transforming the down-mix error concealment frame into a frequency domain to generate a transformed down-mix error concealment frame The operations further include decorrelating the transformed down-mix concealment frame to generate a decorrelated concealment frame. The operations further include obtaining a residual signal spectrum of a stored residual signal of a previously received multichannel audio signal. The operations further include generating an energy adjusted decorrelated residual signal concealment frame using the residual signal spectrum and providing the transformed down-mix error concealment frame, the energy-adjusted decorrelated residual concealment frame, and multi-channel audio parameters from the previously received multichannel audio signal frame to a parametric multi-channel audio synthesis component to generate a synthesized multichannel audio frame. The operations further include performing an inverse frequency domain transformation of the synthesized multichannel audio frame to generate a substitution frame for the lost or corrupted multichannel audio frame.

According to other embodiments of inventive concepts, an computer program product comprising a non-transitory computer readable medium storing computer program code which when executed by at least one processor causes the at least one processor to: generate a down-mix error concealment frame; transform the down-mix error concealment frame into a frequency domain to generate a transformed down-mix error concealment frame; decorrelate the transformed down-mix concealment frame to generate a decorrelated concealment frame; obtain a residual signal spectrum of a stored residual signal of a previously received multichannel audio signal; generate an energy adjusted decorrelated residual signal concealment frame using the residual signal spectrum; provide the transformed down-mix error concealment frame, the energy-adjusted decorrelated residual concealment frame, and multi-channel audio parameters from the previously received multichannel audio signal frame to a parametric multi-channel audio synthesis component to generate a synthesized multichannel audio frame; and perform an inverse frequency domain transformation of the synthesized multichannel audio frame to generate a substitution frame for the lost or corrupted multichannel audio frame.

According to some other embodiments of inventive concepts, a method is provided to approximate a lost or corrupted multichannel audio frame of a received multichannel audio signal in a decoding device comprising a processor, the method comprising the following operations performed by the processor. The operations include generating a down-mix error concealment frame and transforming the down-mix error concealment frame into a frequency domain to generate a transformed down-mix error concealment frame The operations further include decorrelating the transformed down-mix concealment frame to generate a decorrelated concealment frame. The operations further include obtaining a residual signal spectrum of a stored residual signal of a previously received multichannel audio signal. The operations further include generating an energy adjusted decorrelated residual signal concealment frame using the residual signal spectrum. The operations further include obtaining a set of multi-channel audio substitution parameters. The operations further include performing an inverse frequency domain transformation of the transformed down-mix error concealment frame, the energy-adjusted decorrelated residual concealment frame, and multi-channel audio parameters from the previously received multichannel audio signal frame to generate a transformed down-mix error concealment time-domain frame, an energy-adjusted decorrelated residual concealment time domain frame, and multi-channel audio time domain parameters. The operations further include providing the transformed down-mix error concealment time-domain frame, the energy-adjusted decorrelated residual concealment time-domain frame, and the multi-channel audio time-domain parameters to a parametric multi-channel audio synthesis component to generate a synthesized multichannel audio substitute frame.

According to some other embodiments of inventive concepts, a computer program product comprising a non-transitory computer readable medium storing computer program code which when executed by at least one processor causes the at least one processor to: generate a down-mix error concealment frame; transform the down-mix error concealment frame into a frequency domain to generate a transformed down-mix error concealment frame; decorrelate the transformed down-mix concealment frame to generate a decorrelated concealment frame; obtain a residual signal spectrum of a stored residual signal of a previously received multichannel audio signal frame; generate an energy adjusted decorrelated residual signal concealment frame using the residual signal spectrum; obtain a set of multi-channel audio time-domain substitution parameters; perform an inverse frequency domain transformation of the transformed down-mix error concealment frame, the energy-adjusted decorrelated residual concealment frame to generate a transformed down-mix error concealment time-domain frame and an energy-adjusted decorrelated residual concealment time domain frame; and provide the transformed down-mix error concealment time-domain frame, the energy-adjusted decorrelated residual concealment time-domain frame, and the multi-channel audio time-domain substitution parameters to a parametric multi-channel audio synthesis component to generate a synthesized multichannel audio substitute frame.

According to some other embodiments of inventive concepts, an apparatus configured to approximate a lost or corrupted multichannel audio frame of a received multichannel audio signal is provided. The apparatus includes at least one processor and memory communicatively coupled to the processor, said memory comprising instructions executable by the processor, which cause the processor to perform operations. The operations include generating a down-mix error concealment frame and transforming the down-mix error concealment frame into a frequency domain to generate a transformed down-mix error concealment frame The operations further include decorrelating the transformed down-mix concealment frame to generate a decorrelated concealment frame. The operations further include obtaining a residual signal spectrum of a stored residual signal of a previously received multichannel audio signal. The operations further include generating an energy adjusted decorrelated residual signal concealment frame using the residual signal spectrum. The operations further include obtaining a set of multi-channel audio substitution parameters. The operations further include performing an inverse frequency domain transformation of the transformed down-mix error concealment frame, the energy-adjusted decorrelated residual concealment frame, and multi-channel audio parameters from the previously received multichannel audio signal frame to generate a transformed down-mix error concealment time-domain frame, an energy-adjusted decorrelated residual concealment time domain frame, and multi-channel audio time domain parameters. The operations further include providing the transformed down-mix error concealment time-domain frame, the energy-adjusted decorrelated residual concealment time-domain frame, and the multi-channel audio time-domain parameters to a parametric multi-channel audio synthesis component to generate a synthesized multichannel audio substitute frame.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
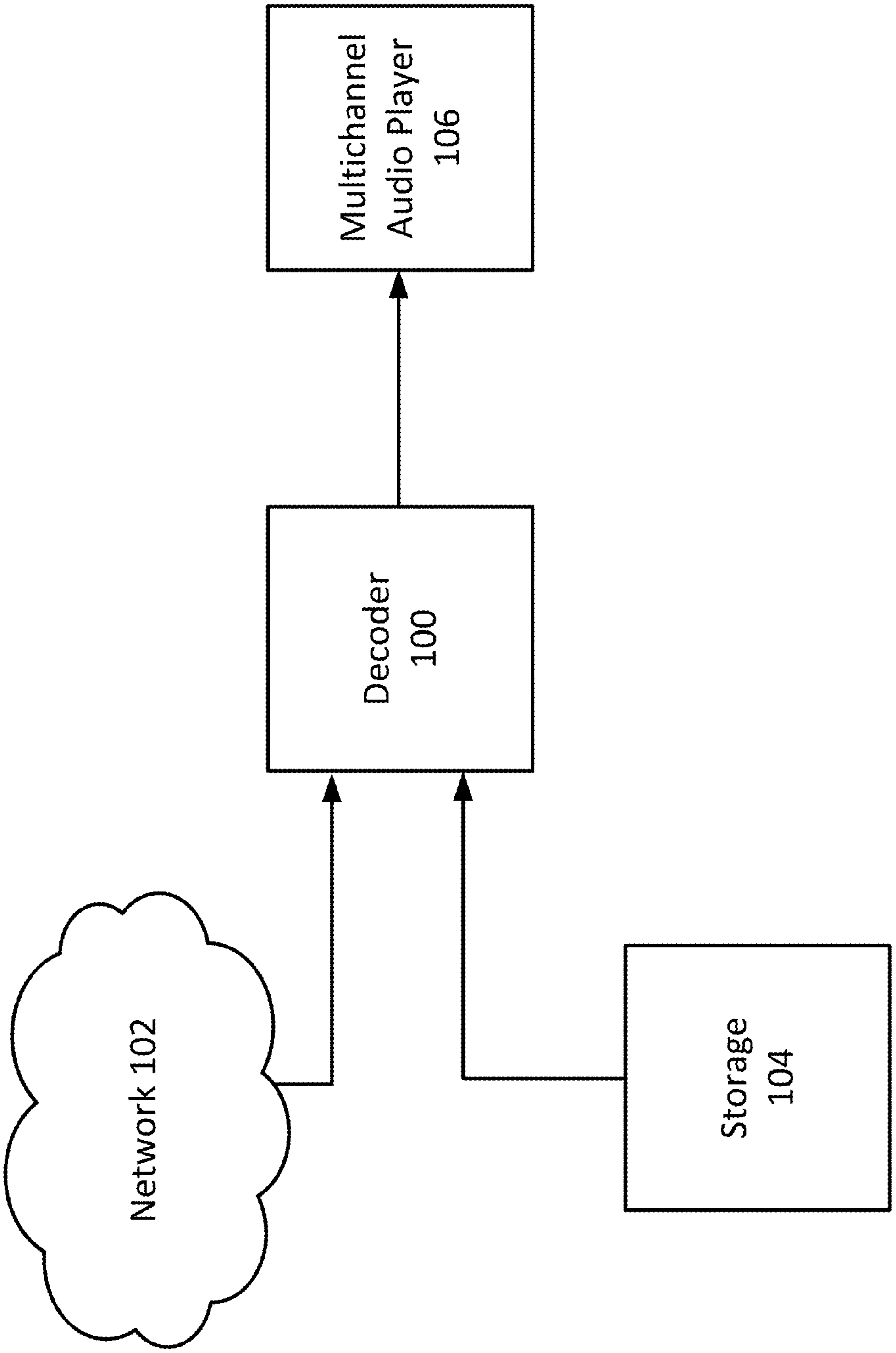
FIG. 1 is a block diagram illustrating an example of an environment of a loss concealment system according to some embodiments.

FIG. 1 illustrates an example of an operating environment of a decoder 100 that may be used to decode multichannel bitstreams as described herein. The decoder 100 may be part of a media player, a mobile device, a set-top device, a desktop computer, and the like. The decoder 100 receives encoded bitstreams. The bitstreams may be sent from an encoder, from a storage device 104, from a device on the cloud via network 102, etc. During operation, decoder 100 receives and processes the frames of the bitstream as described herein. The decoder 100 outputs multi-channel audio signals and transmits the multi-channel audio signals to a multi-channel audio player 106 having at least one loudspeaker for playback of the multi-channel audio signals. Storage device 104 may be part of a storage depository of multi-channel audio signals such as a storage repository of a store or a streaming music service, a separate storage component, a component of a mobile device, etc. Multi-channel audio player may be a Bluetooth speaker, a device having at least one loudspeaker, a mobile device, a streaming music service, etc.

Figure 11:
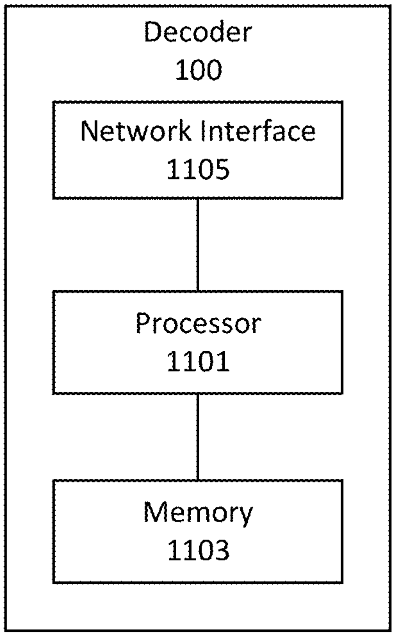
FIG. 11 is a block diagram illustrating a decoder according to some embodiments of inventive concepts.

FIG. 11 is a block diagram illustrating elements of decoder 100 configured to decode multi-channel audio frames and provide concealment for lost or corrupt frame according to some embodiments of inventive concepts. As shown, decoder 100 may include a network interface circuit 1105 (also referred to as a network interface) configured to provide communications with other devices/entities/functions/etc. The decoder 100 may also include a processor circuit 1101 (also referred to as a processor) coupled to the network interface circuit 1105, and a memory circuit 1103 (also referred to as memory) coupled to the processor circuit. The memory circuit 1103 may include computer readable program code that when executed by the processor circuit 1101 causes the processor circuit to perform operations according to embodiments disclosed herein.

According to other embodiments, processor circuit 1101 may be defined to include memory so that a separate memory circuit is not required. As discussed herein, operations of the decoder 100 may be performed by processor 1101 and/or network interface 1105. For example, processor 1101 may control network interface 1105 to transmit communications to multichannel audio players 106 and/or to receive communications through network interface 102 from one or more other network nodes/entities/servers such as encoder nodes, depository servers, etc. Moreover, modules may be stored in memory 1103, and these modules may provide instructions so that when instructions of a module are executed by processor 1101, processor 1101 performs respective operations.

Figure 2:
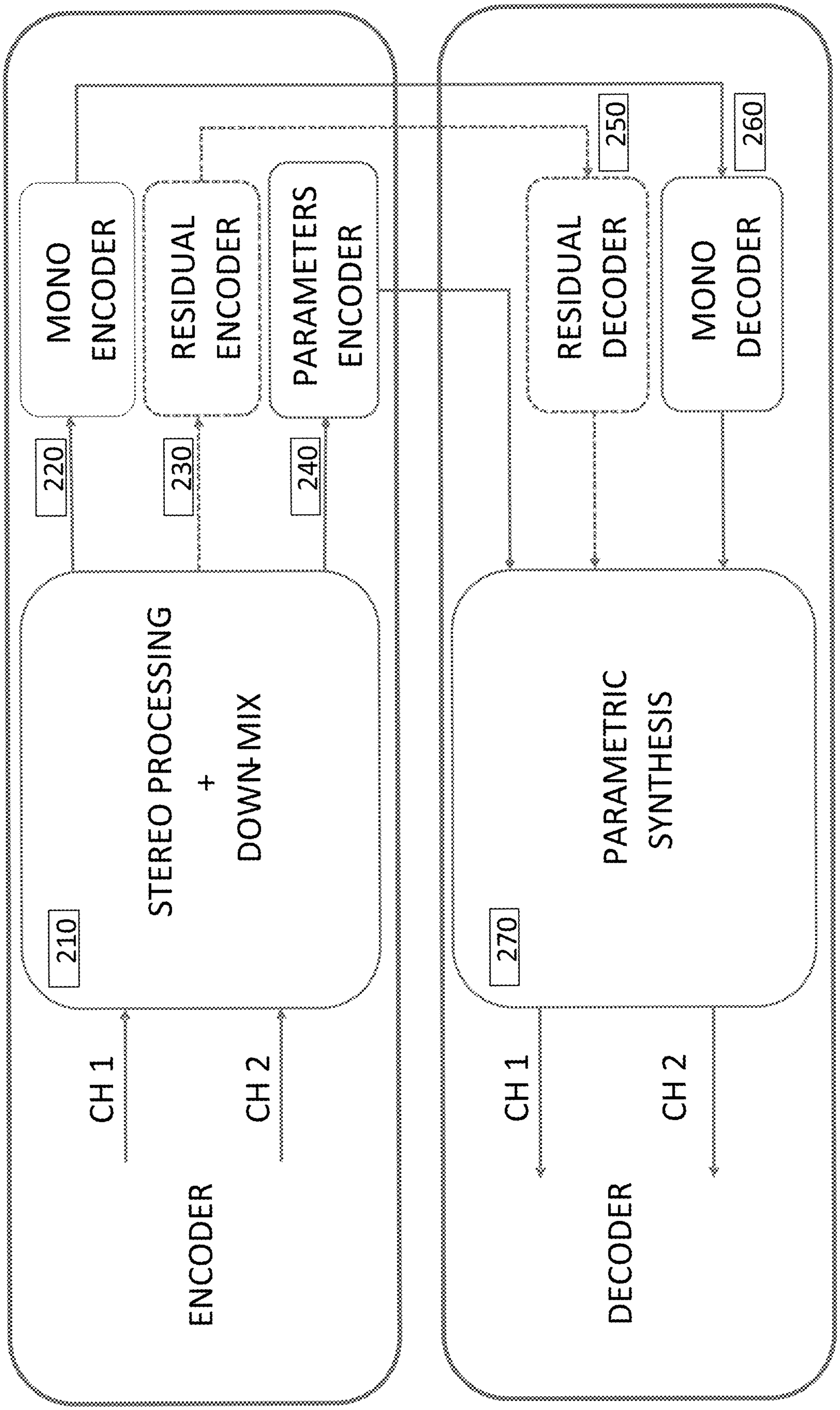
FIG. 2 is a block diagram illustrating components of a parametric stereo codec according to some embodiments.
Figure 4:
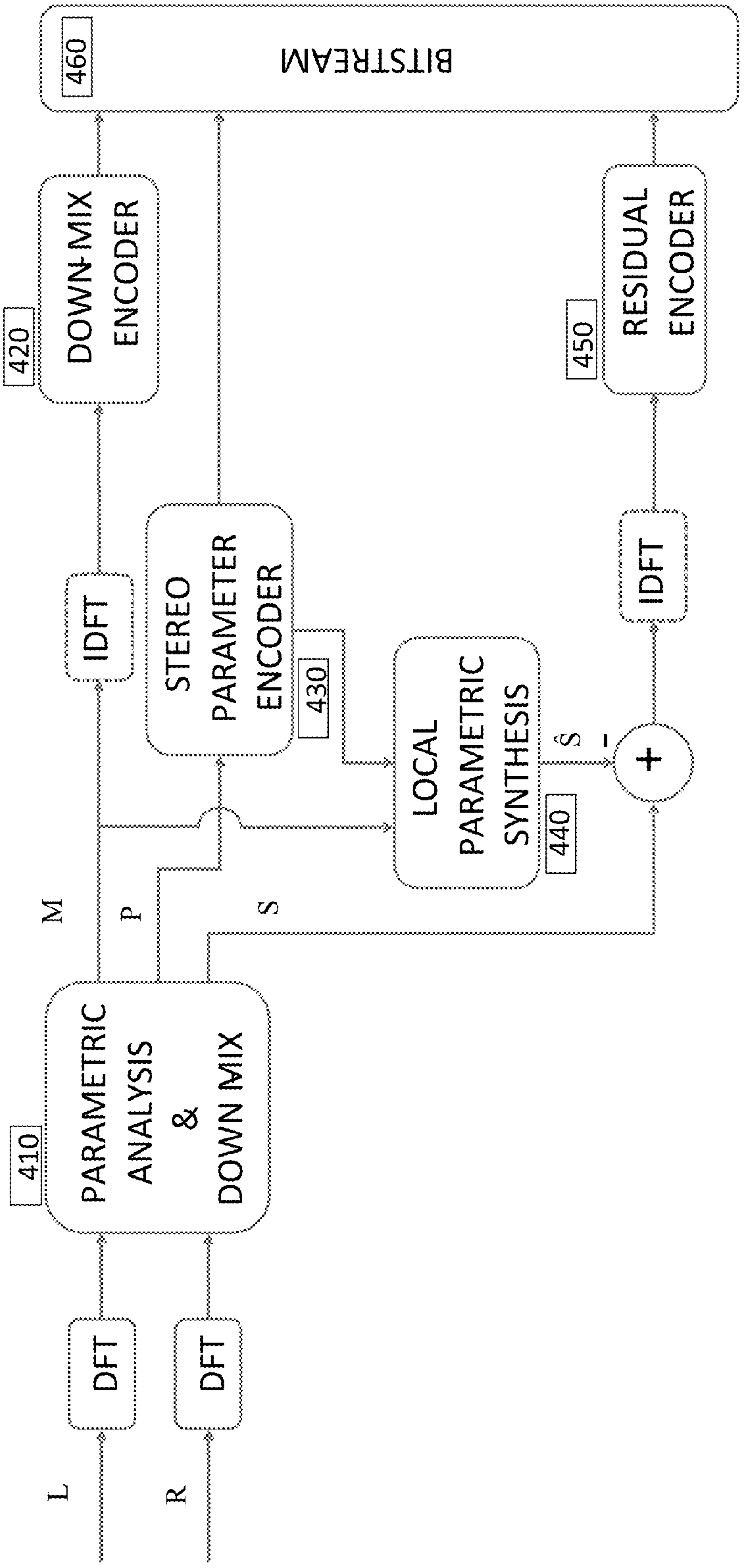
FIG. 4 is a block diagram illustrating a stereo parametric encoder according to some embodiments.

In one embodiment, the multi-channel decoder of a multi-channel encoder and decoder system as outlined in FIG. 2 may be used. In more detail, the encoder can be described with reference to FIG. 4. In the description that follows, two channels will be used to describe the embodiments. These embodiments may be used with more than two channels. The multi-channel encoder processes the input left and right channels (designated as CH1 and CH2 in FIG. 2 and denoted L and R in FIG. 4) in segments referred to as frames. For a given frame m the two input channels may be written $$\begin{cases} l(m, n) \\ r(m, n) \end{cases}$$

where l denotes the left channel, r denotes the right channel, n=0, 1, 2, . . . , N denotes the sample number in frame m and N is the length of the frame. In an embodiment, the frames may be extracted with an overlap in the encoder such that the decoder may reconstruct the multi-channel audio signals using an overlap add strategy. The input channels are windowed with a suitable windowing function w(n) and transformed to the Discrete Fourier Transform (DFT) domain. Note that other frequency domain representations may be used here, such as a Quadrature Mirror Filter (QMF) filter bank, a Hybrid QMF filter bank or an odd DFT (ODFT) representation which is composed of the MDCT and MDST transform components.

$$\begin{cases} X_L(m,k) = \sum_{n=0}^{N-1} l(m,n)w(n)e^{-\frac{j2\pi kn}{N}} \\ X_R(m,k) = \sum_{n=0}^{N-1} r(m,n)w(n)e^{-\frac{j2\pi kn}{N}} \end{cases}$$

The signals are then analyzed in parametric analysis block 410 to extract the ITD, IPD and ILD parameters. In addition, the channel coherence may be analyzed, and an ICC parameter may be derived. The set of multi-channel audio parameters for frame m may be denoted P(m), which contains the complete set of ITD, IPD, ILD and ICC parameters used in the parametric representation. The parameters are encoded by a parameter encoder 430 and added to the bitstream to be stored and/or transmitted to a decoder.

Before producing a down-mix channel, in one embodiment, it may be beneficial to compensate for the ITD and IPD to reduce the cancellation and maximize the energy of the down-mix. The ITD compensation may be implemented both in time domain before the frequency transform or in frequency domain, but it essentially performs a time shift on one or both channels to eliminate the ITD. The phase alignment may be implemented in different ways, but the purpose is to align the phase such that the cancellation is minimized. This ensures maximum energy in the down-mix. The ITD and IPD adjustments may be done in frequency bands or be done on the full frequency spectrum and it should preferably be done using the quantized ITD and IPD parameters to ensure that the modification can be inverted in the decoder stage.

The embodiments described below are independent of the realization of the IPD and ITD parameter analysis and compensation. In other words, the embodiments are not dependent on how the IPD and ITP are analyzed or compensated In such embodiments, the ITD and IPD adjusted channels are denoted with an asterisk:

$$\begin{cases} X_L^*(m,k) \\ X_R^*(m,k) \end{cases}$$

The ITD and IPD adjusted input channels are then down-mixed by the parametric analysis and down-mix block 410 to produce a mid/side representation, also called a down-mix/side representation. One way to perform the down-mix is to use the sum and difference of the signals.

$$\begin{cases} X_M(m,k) = \frac{(X_L^*(m,k) + X_R^*(m,k))}{2} \\ X_S(m,k) = \frac{(X_L^*(m,k) - X_R^*(m,k))}{2} \end{cases}$$

The down-mix signal $X_M$(m,k) is encoded by down-mix encoder 420 to be stored and/or transmitted to a decoder. This encoding may be done in frequency domain, but it may also be done in time domain. In that case a DFT synthesis stage is required to produce a time domain version of the down-mix signal, which is in turn provided to the down-mix encoder 420. The transformation to time domain may, however, introduce a delay misalignment with the multi-channel audio parameters that would require additional handling. In one embodiment, this is solved by introducing additional delay or by interpolating the parameters to ensure that the decoder synthesis of the down-mix and the multi-channel audio parameters are aligned.

The complementary side signal $X_S$(m,k) may be generated from the down-mix and the obtained multi-channel audio parameters by a local parametric synthesis block 440. A side signal prediction $X_{\hat{S}}$(m,k) can be derived using the down-mix signal $$X_{\hat{S}}(m,k) = p(X_M(m,k))$$

where p(•) is a predictor function and may be implemented as a single scaling factor α which minimizes the mean squared error (MSE) between the side signal and the predicted side signal. Further, the prediction may be applied on frequency bands and involve a prediction parameter for each frequency band b.

$$X_{\hat{S}}(m,k) = \alpha_b X_M(m,k),\ k = k_{start(b)} \ldots k_{end(b)}$$

If the coefficients of band b are designated as column vectors $X_{\hat{S},b}$(m) and $X_{M,b}$(m), the minimum MSE predictor can be derived as $$\alpha_b = \frac{X_{M,b}(m)^T X_{S,b}(m)}{X_{M,b}(m)^T X_{M,b}(m)}$$

However, this expression may be simplified to produce a more stable prediction parameter. The prediction parameter $\alpha_b$ can be used as an alternative implementation of the ILD parameter. Further details are described in the prediction mode of reference [4].

Given the predicted side signal, a prediction residual $X_R$(m,k) can be created [4].

$$X_R(m,k) = X_S(m,k) - X_{\hat{S}}(m,k)$$

The prediction residual may be inputted in to a residual encoder 450. The encoding may be done directly in DFT domain or it could be done in time domain. Similarly, as for the down-mix encoder, a time domain encoder would require a DFT synthesis which may require alignment of the signals in the decoder. The residual signal represents the diffuse component which is not correlated with the down-mix signal. If a residual signal is not transmitted, a solution in one embodiment may be to substitute a signal for the residual signal in the stereo synthesis state in the decoder with the signal coming from a decorrelated version of the decoded down-mix signal. The substitute is typically used for low bitrates where the bit budget is too low to represent the residual signal with any useful resolution. For intermediate bit rates, it is common to encode a part of the residual. In this case the lower frequencies are often encoded, since they are perceptually more relevant. For the remaining part of the spectrum, the decorrelator signal is used as a substitute for the residual signal in the decoder. This approach is often referred to as a hybrid coding mode [4]. Further details are provided in the decoder description below.

The representation of the encoded down-mix, the encoded multi-channel audio parameters, and the encoded residual signal is multiplexed into a bitstream 360, which may be transmitted to a decoder or stored in a medium for future decoding.

Figure 5:
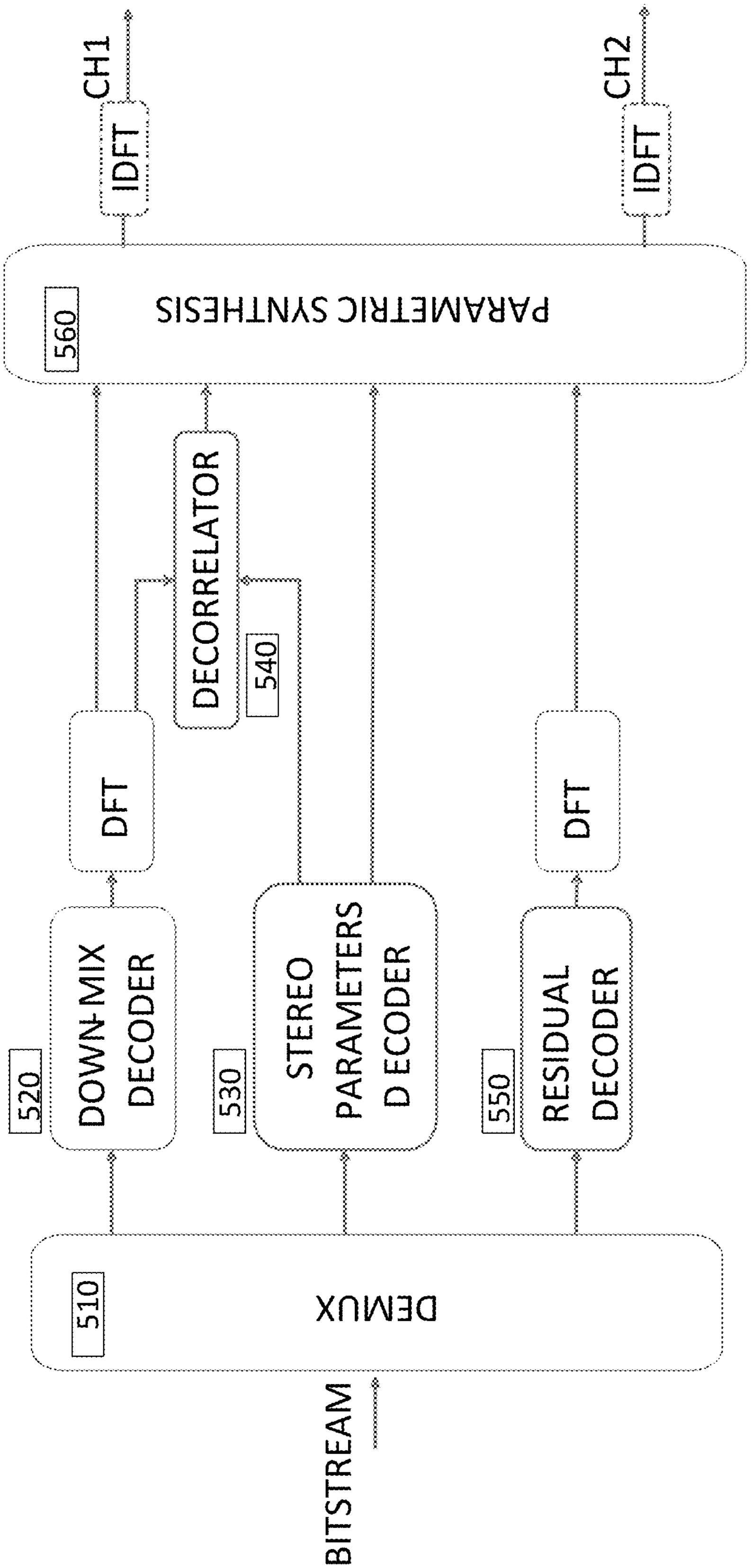
FIG. 5 is a block diagram illustrating a stereo parametric decoder according to some embodiments.
Figure 6:
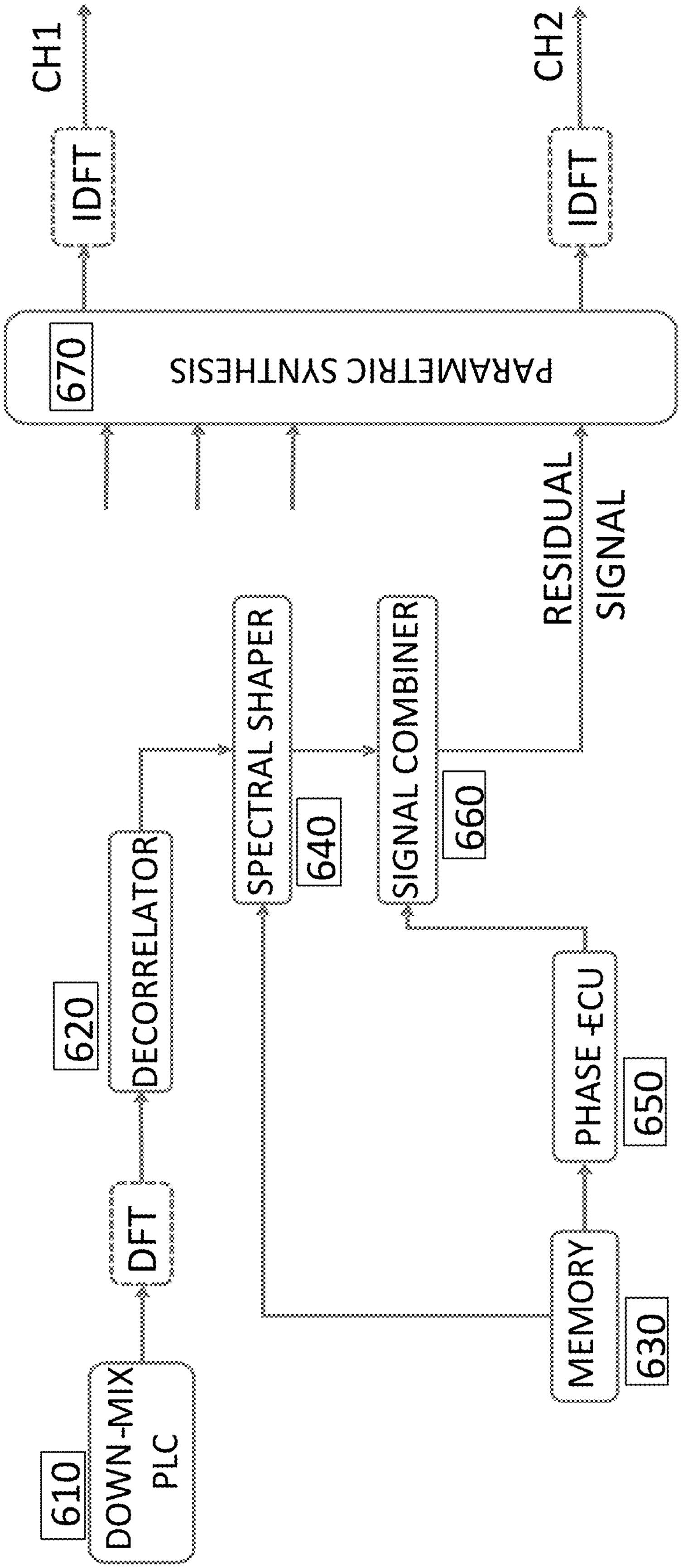
FIG. 6 is a block diagram illustrating operations to generate a residual signal according to some embodiments of inventive concepts.
Figure 7:
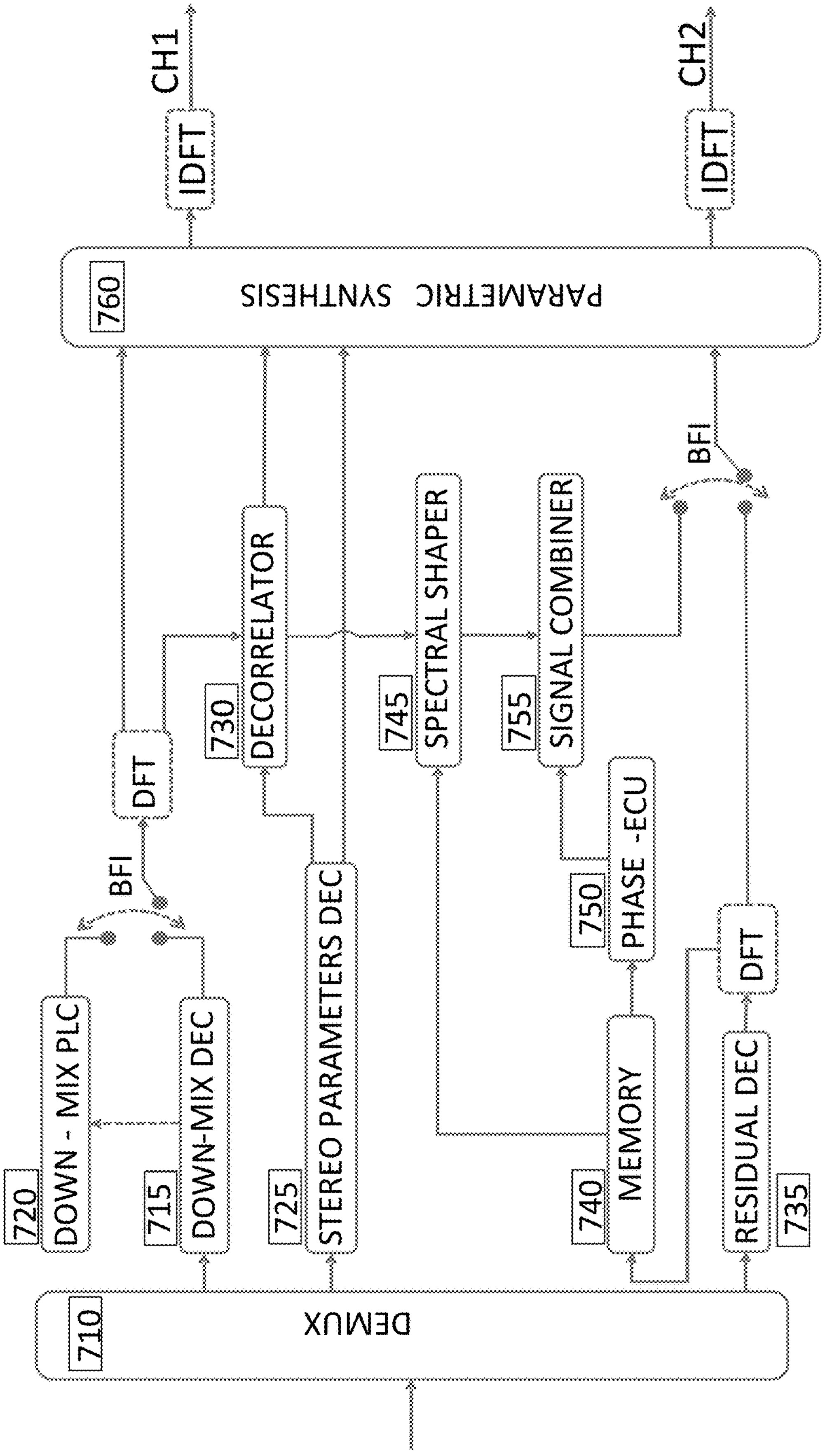
FIG. 7 is a block diagram illustrating operations to generate a substitution multichannel audio frame according to some embodiments of inventive concepts.

In one embodiment, a multi-channel decoder is used in DFT domain as outlined in FIGS. 5-7. FIG. 5 illustrates an embodiment of a decoder in which the blocks of FIG. 6 that generate a residual signal in case of a lost frame. FIG. 7 illustrates an embodiment of a combination of the blocks of FIGS. 5 and 6. In the description that follows, the blocks of FIG. 7 shall be used. However, it should be noted that the demux 710 of FIG. 7 provides at least the same functions as demux 510 of FIG. 5, the down mix decoder 715 of FIG. 7 provides at least the same functions as the down mix decoder 520 of FIG. 5, the stereo parameters decoder 725 of FIG. 7 provides at least the same functions of stereo parameters 530 of FIG. 5, decorrelator 730 of FIG. 7 provides at least the same functions of decorrelator 540 of FIG. 5, residual decoder 735 of FIG. 7 provides at least the same functions as residual decoder 550 of FIG. 5, parametric synthesis block 760 of FIG. 7 provides at least the same functions of parametric synthesis block 560 of FIG. 5. Similarly, the down-mix PLC 720 of FIG. 7 provides at least the same functions of down-mix PLC 610 of FIG. 6, the decorrelator 730 of FIG. 7 provides at least the same functions of decorrelator 620 of FIG. 6, memory 740 of FIG. 7 provides at least the same functions of memory 630 of FIG. 6, spectral shaper 745 of FIG. 7 provides at least the same functions of spectral shaper 640 of FIG. 6, phase-ecu 750 of FIG. 7 provides at least the same functions as phase-ecu 650 of FIG. 6, signal combiner 755 of FIG. 7 provides at least the same functions as signal combiner 660 of FIG. 6, and parametric synthesis block 760 of FIG. 7 provides at least the same functions of parametric synthesis block 670 of FIG. 6.

Turning now to FIG. 7, a down-mix decoder 715 provides a reconstructed down-mix signal $\hat{M}(m,n)$ which is segmented into DFT analysis frames m and n=0, 1, 2, . . . , N−1 denote the sample numbers within frame m. The analysis frames are typically extracted with an overlap which permits an overlap-add strategy in the DFT synthesis stage. The corresponding DFT spectra may be obtained through a DFT transform $$X_{\hat{M}}(m,k)=\sum_{n=0}^{N-1}\hat{M}(m,n)w(n)e^{-\frac{j2\pi kn}{N}}$$

where w(n) denotes a suitable windowing function. The shape of the windowing function can be designed using a trade-off between frequency characteristics and algorithmic delay due to length of the overlapping regions. Similarly, a residual decoder 635 produces a reconstructed residual signal $\hat{R}(m,n)$ for frame m and time instances n=0, 1, 2, . . . $N_R$. Note that the frame length $N_R$ may be different from N since the residual signal may be produced at a different sampling rate. Since the residual coding may be targeted only for the lower frequency range, it may be beneficial to represent it with a lower sampling rate to save memory and computational complexity. A DFT representation of the residual signal $X_{\hat{R}}(m,k)$ is obtained. Note that if the residual signal is upsampled in DFT domain to the same sampling rate as the reconstructed down-mix, the DFT coefficients will need to be scaled with $N/N_R$ and the $X_{\hat{R}}(m,k)$ would be zero-padded to match the length N. To simplify the notation, and since the embodiment is not affected by the use of different sampling rates, for purposes of better understanding of the method, the sampling rates shall be equal and $N_R$=N in the following description. Thus, no scaling or zero-padding shall be shown.

It should be noted that the frequency transform by means of a DFT is not necessary in case the down-mix and/or the residual signal is encoded in DFT domain. In this case, the decoding of the down-mix and/or residual signal provides the DFT spectrum that are necessary for further processing.

In an error free frame, often referred to as a good frame, the multi-channel audio decoder produces the multi-channel synthesis using the decoded down-mix signal together with the decoded multi-channel audio parameters in combination with the decoded residual signal. The DFT spectrum of the residual signal $X_{\hat{R}}(m,k)$ is stored in memory 740, such that the variable $X_{\hat{R},mem}(k)$ always holds the residual signal spectrum of the last received frame.

$$X_{\hat{R},mem}(k):=X_{\hat{R}}(m,k)$$

In some embodiments, a relevant subpart of the spectrum may be stored in order to save memory, e.g. only the lower frequency bins. In other embodiments, the residual signal may be stored in the time domain and the DFT spectrum may be obtained only when error occurs. This could reduce the peak computational complexity since the error concealment operation typically has lower complexity than the decoding of a correctly received frame. In the description that follows, the residual signal is already transformed to DFT domain during normal operation and the residual signal is stored as a DFT spectrum. In other embodiments, the residual signal is stored in the time domain. In these embodiments, the residual signal spectrum is obtained by transforming the residual signal to the DFT domain.

The decoded down-mix $\hat{M}(m,n)$ is fed to the decorrelator 730 to synthesize a non-correlated signal component D(m, n), and the resulting signal is transformed to DFT domain $X_D(m,k)$. Note that the decorrelation may also be carried out in the frequency domain. The decoded down-mix $X_{\hat{M}}(m,k)$, the decorrelated component $X_D(m,k)$, and the residual signal $X_{\hat{R}}(m,k)$ is fed together with the multi-channel audio parameters P(m) to the parametric multi-channel synthesis block 660 to produce the reconstructed multi-channel audio signal. After the multi-channel synthesis in DFT domain has been applied, the left and right channels are transformed to time domain and output from the stereo decoder.

Figure 12:
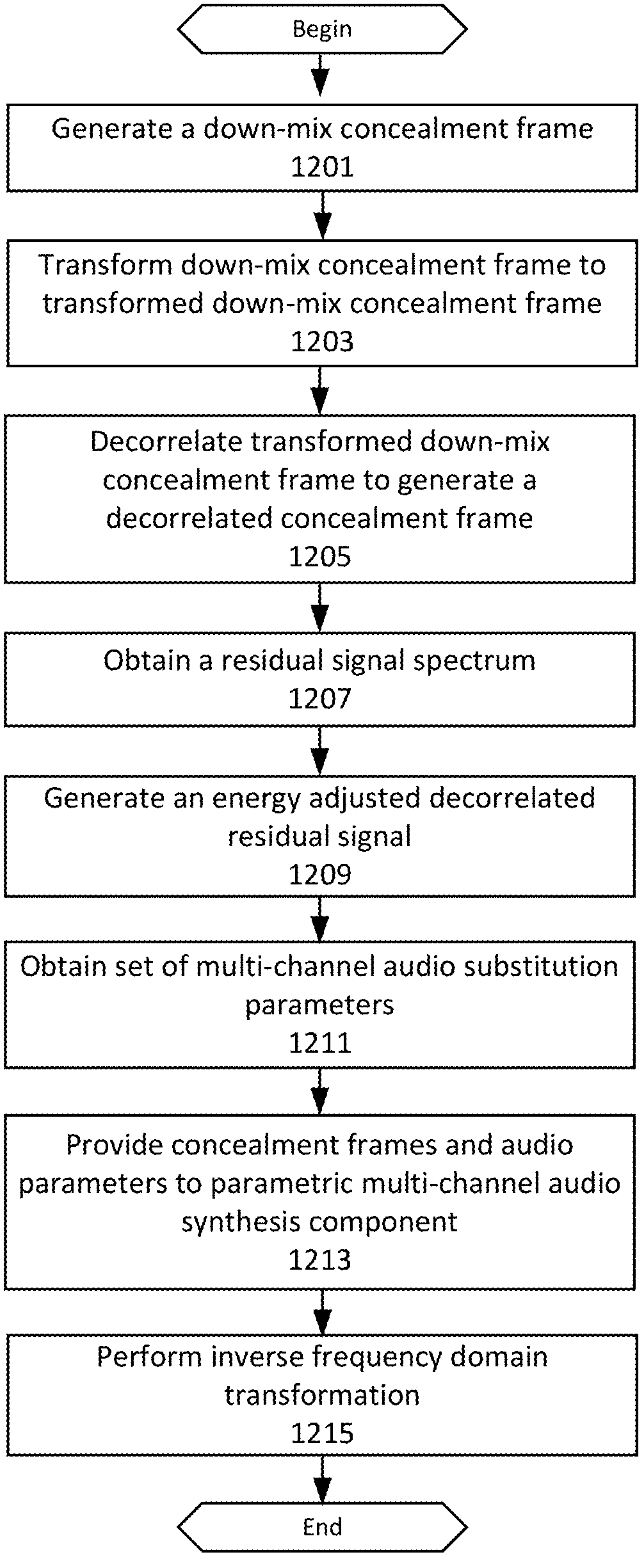
FIGS. 12-18 are flow charts illustrating operations of a decoder in accordance with some embodiments of inventive concepts.

Turning to FIG. 12, operations the decoder 100 may perform when the decoder 100 detects a lost or corrupted multichannel audio frame (i.e., a bad frame) of an encoded multichannel audio signal. When the decoder detects a lost or corrupted frame, i.e., a bad frame (as represented by the bad frame indicator (BFI) in FIG. 7), the PLC technique is performed. In operation 1201, the PLC of the down-mix decoder 715 is activated and generates an error concealment frame for the down-mix $\hat{M}_{ECU}(m,n)$. The down-mix error concealment frame is frequency transformed to produce the corresponding DFT spectrum $X_{\hat{M},ECU}(m,n)$ in operation 1203. In operation 1205, the transformed down-mix error concealment frame may be input into the same decorrelator function 730 that is used for the down-mix to generate the decorrelated concealment frame $D_{ECU}(m,n)$ or input to a different decorrelator function and then frequency transformed to produce a decorrelated down-mix concealment frame $X_{D,ECU}(m,k)$.

The decorrelator function may be done in time domain before transformation, in the form of an all-pass filter, a delay, or a combination thereof. It may also be done in frequency domain after the frequency transform, in which case it would operate on frames, likely including past frames.

In operation 1207, a residual signal spectrum is obtained. The residual signal spectrum may be retrieved from storage when it has been previously stored. In situations where the residual signal is stored prior to DFT transformation operations, then the residual signal spectrum is obtained by performing a DFT operation on the stored residual signal. To generate a concealment frame for the residual signal, an energy adjusted decorrelated residual signal is generated in operation 1209. In operation 1209, a Phase ECU 750 performs a phase extrapolation or phase evolution strategy on a residual signal from the past synthesis which is stored in memory 740 as previously described. See also [3].

Figure 3:
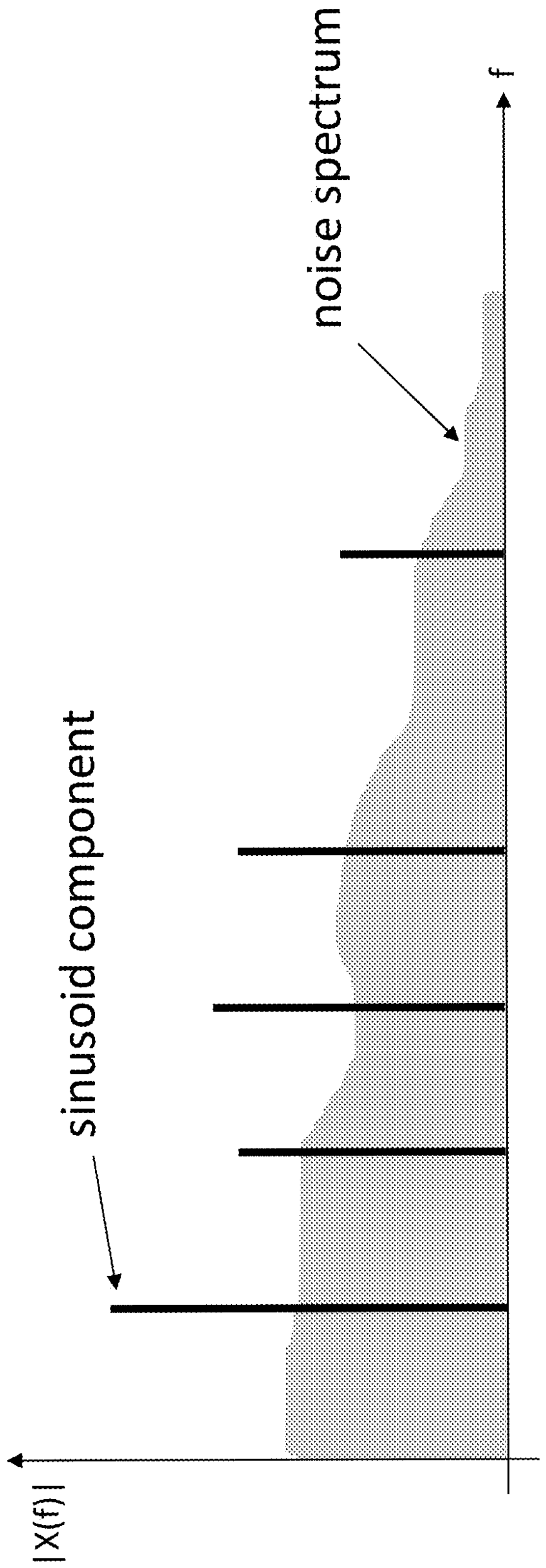
FIG. 3 is a plot illustrating a sinusoid component and a noise spectrum that are combined according to some embodiments.
Figure 13:
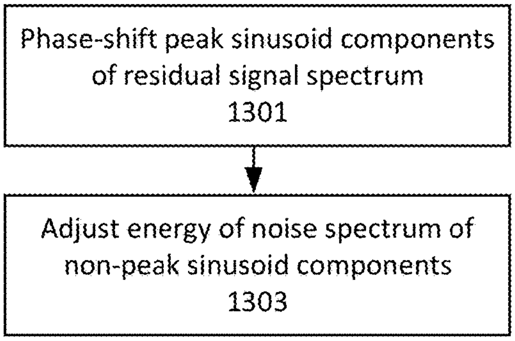

Turning to FIG. 13, the phase extrapolation or phase evolution strategy phase-shifts the peak sinusoids of the residual signal spectrum (see sinusoid component of FIG. 3) in operation 1301 and the energy of the noise spectrum of non-peak sinusoids (see noise spectrum of FIG. 3) is adjusted in operation 1303. Further details of these operations are provided in FIG. 14.

Figure 14:
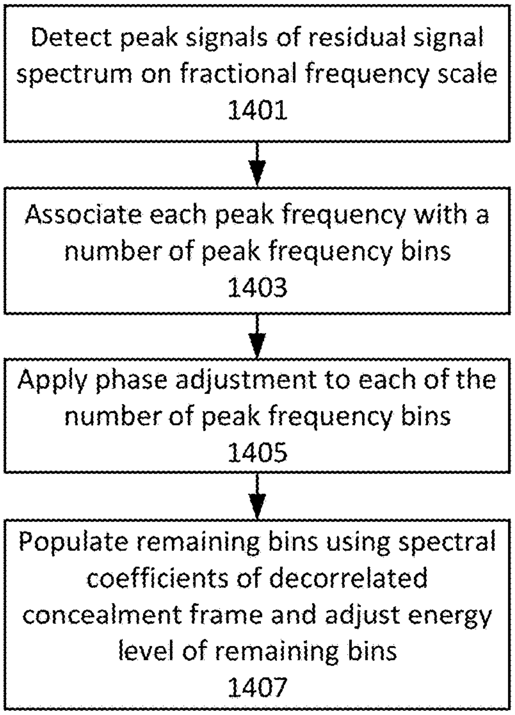

Turning to FIG. 14, in operation 1401, the residual signal spectrum $X_{\hat{R},mem}(k)$, which may also be referred to as a "prototype signal" is first input to a peak detector circuit that detects peak frequencies on a fractional frequency scale. A set of peaks $$F = \{f_i\},\ i = 1, 2, \ldots\ N_{peaks}$$

may be detected which are represented by their estimated fractional frequency $f_i$ and where $N_{peaks}$ is the number of detected peaks. Here the fractional frequency is expressed as a fractional number of DFT bins, such that e.g. the Nyquist frequency is found at f=N/2+1. In operation 1403, each detected peak is then associated with a number of frequency bins representing the detected peak. The number of frequency bins may be found by rounding the fractional frequency to the closest integer and including the neighboring bins, e.g. the $N_{near}$ peaks on each side:

$$\begin{cases} k_i = [f_i] \\ G_i = \{k_i - N_{near}, \ldots , k_i, \ldots , k_i + N_{near}\} \end{cases}$$

where [•] represents the rounding operation and $G_i$ is the group of bins representing the peak at frequency $f_i$. The number $N_{near}$ is a tuning constant that is determined when designing the system. A larger $N_{near}$ gives higher accuracy in each peak representation, but also introduces a larger distance between peaks that may be modeled. A suitable value for $N_{near}$ may be 1 or 2. A concealment spectrum $X_{R,ECU}(m,k)$ for the residual signal is formed by inserting the group of bins, including a phase adjustment operation 1405, which is based on the fractional frequency and the number of samples between the analysis frame of the previous frame and where the current frame would start.

$$N_{step} = N - N_{overlap}$$

The phase adjustment for each peak frequency $f_i$ is applied to each corresponding group of bins $G_i$ according to the phase adjustment $$\Delta\phi_i = 2\pi N_{step} f_i / N$$

which is applied to the corresponding bins of the concealment spectrum for the residual signal $$X_{R,ECU}(m, k) = X_{\hat{R},mem}(k)e^{j\Delta\phi_i},\ k \in G_i$$

Figure 10A:
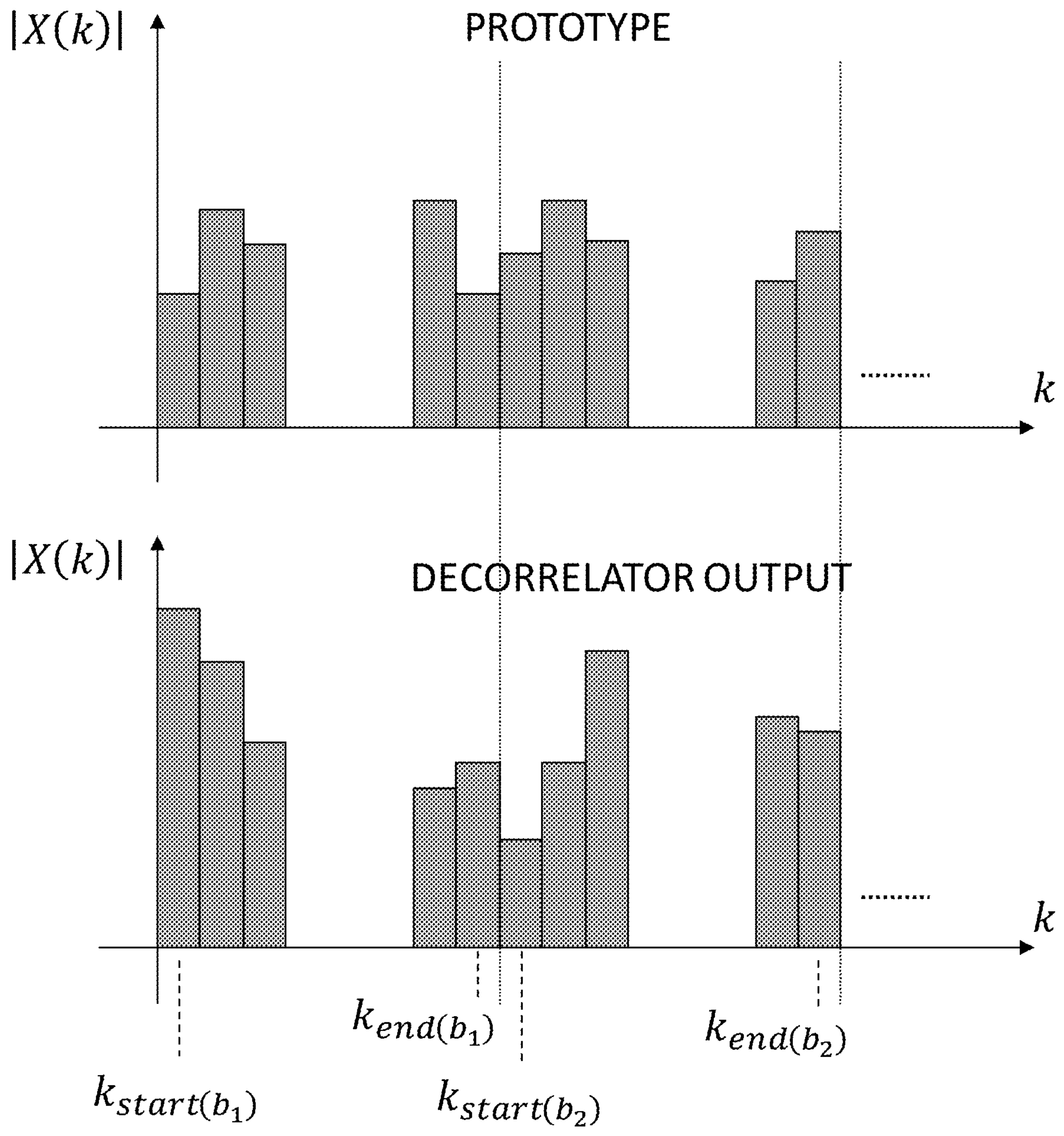
FIGS. 10A and 10B are an illustration of a generated spectrum of a generated residual signal according to some embodiments of inventive concepts.

In operation 1407, the remaining bins of $X_{R,ECU}(m,k)$, which are not occupied by the peak bins $G_i$, which may be referred to as the noise spectrum or the noise component of the spectrum, are populated using the spectral coefficients of the decorrelated concealment frame $X_{D,ECU}(m,k)$. To ensure the coefficients have the appropriate energy level and overall spectral shape, the energy may be adjusted to match the energy of the noise spectrum of the residual spectrum memory $X_{\hat{R},mem}(k)$. This may be done by setting all peak bins $G_i$ to zero in a calculation buffer and matching the energy of the remaining noise spectrum bins. The energy matching may be done on a band basis as shown in FIG. 10*a*.

Figure 15:
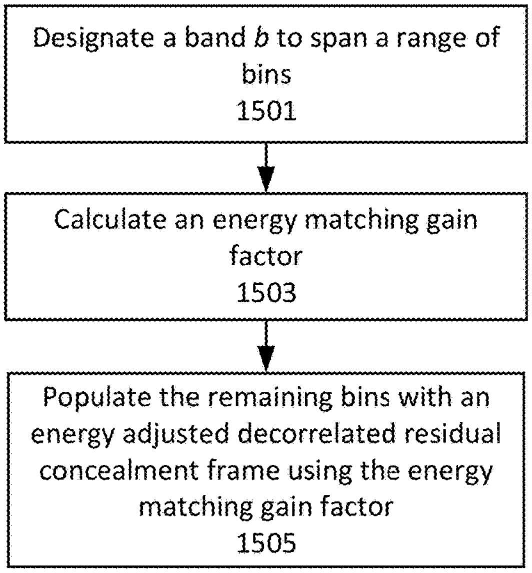

Turning to FIG. 15, a band b is designated in operation 1501 that spans the range of bins $k_{start(b)} \ldots k_{end(b)}$. In operation 1503, the energy matching gain factor $g_b$ can be calculated as:

$$g_b = \sqrt{\frac{\sum_{k=k_{start(b)}}^{k_{end(b)}} X_{\hat{R},mem}(k)^2}{\sum_{k=k_{start(b)}}^{k_{end(b)}} X_{D,ECU(m,k)}^2}}$$

In operation 1505, the noise spectrum bins k are filled with the energy adjusted decorrelated residual concealment frame using the energy matching gain factor:

$$X_{R,ECU}(m, k) = g_b X_{D,ECU}(m, k),\ k \notin G_i,\ \text{for band } b$$

Note that it may also be possible to apply the scaling on wide or narrow bands or even for each frequency bin. In the case of scaling for each bin, the magnitude spectrum of the residual memory $X_{\hat{R},mem}(k)$ is kept while the phase is applied from the spectrum of the decorrelated concealment frame $X_{D,ECU}(m,k)$. For example, the scaling may be achieved either by a magnitude adjustment of $X_{D,ECU}(m,k)$ to match the magnitude of $X_{\hat{R},mem}(k)$, or by a phase adjustment of $X_{\hat{R},mem}(k)$ to match the phase of $X_{D,ECU}(m,k)$. However, performing the scaling on a band basis retains some of the spectral fine structure which may be desirable.

In an embodiment in the case of scaling for each frequency bin, applying the phase from the spectrum of the decorrelated concealment frame $X_{D,ECU}(m,k)$ may use an approximation of the phase. This may reduce the complexity of the scaling. The energy matching gain factor $g_k$ can be calculated as:

$$g_k = \sqrt{\frac{X_{\hat{R},mem}(k)^2}{X_{D,ECU}(m,k)^2}}$$

The noise spectrum bins k are filled with the energy adjusted decorrelated residual concealment frame using the energy matching gain factor:

$$X_{R,ECU}(m,k) = g_k X_{D,ECU}(m,k),\ k \notin G_i,$$

The computation of $g_k$ involves a square root and a division, which may be computationally complex. In an embodiment, an approximate phase adjustment is used that matches the sign and the order of the absolute values of the real and imaginary components of the phase target such that the phase is moved within π/4 of the phase target. This embodiment may skip the gain scaling with the energy matching gain factor $g_k$. $X_{R,ECU}$(m,k) may be written as $$X_{R,ECU}(m,k) = a + jb$$

$$\begin{cases} a = \text{sign}\left(\text{Re}\left(X_{D,ECU}(m,k)\right)\right)\cdot c \\ b = \text{sign}\left(\text{Im}\left(X_{D,ECU}(m,k)\right)\right)\cdot d \end{cases}$$

where (c,d) is $$\begin{cases} c = \left|\text{Re}\left(X_{\hat{R},mem}(k)\right)\right| \\ d = \left|\text{Im}\left(X_{\hat{R},mem}(k)\right)\right| \end{cases}$$

in the case where the order of the absolute values of the real and imaginary components is the same, i.e.

$$\left|\text{Re}\left(X_{\hat{R},mem}(k)\right)\right| \geq \left|\text{Im}\left(X_{\hat{R},mem}(k)\right)\right| \wedge \left|\text{Re}\left(X_{D,ECU}(m,k)\right)\right| \geq \left|\text{Im}\left(X_{D,ECU}(m,k)\right)\right|$$

and otherwise $$\begin{cases} c = \left|\text{Im}\left(X_{\hat{R},mem}(k)\right)\right| \\ d = \left|\text{Re}\left(X_{\hat{R},mem}(k)\right)\right| \end{cases}$$

Figure 19:
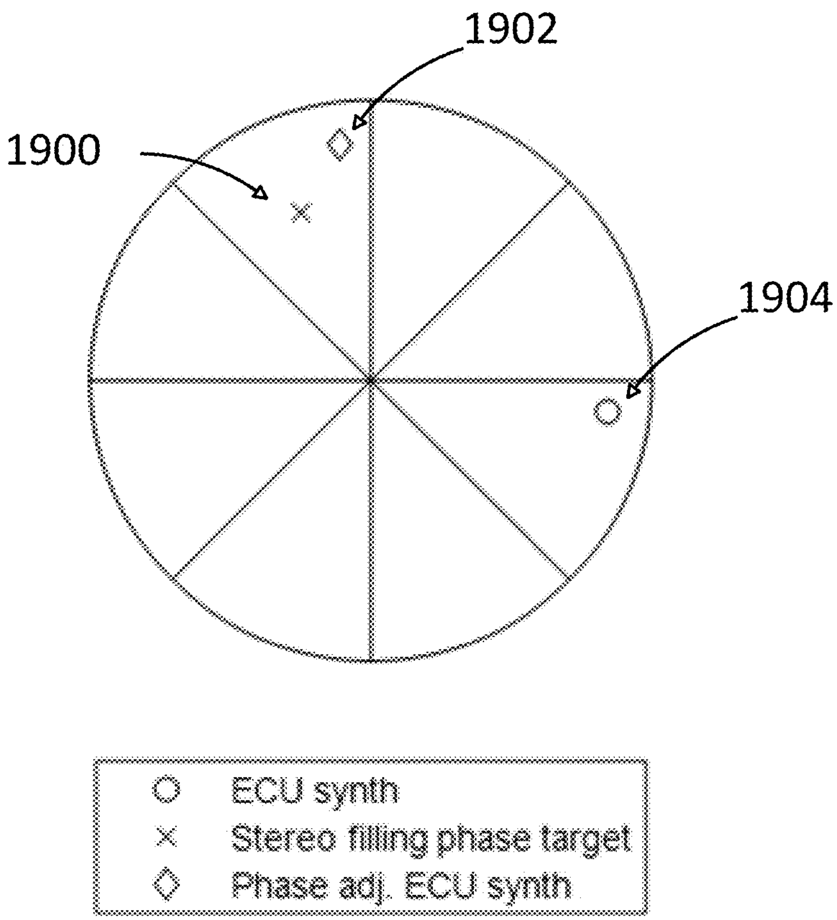
FIG. 19 is a block diagram illustrating an approximate phase adjustment in accordance with some embodiments of inventive concepts.

The approximate phase adjustment is illustrated in FIG. 19. In FIG. 19, the phase target is given by $X_{D,ECU}$(m,k) illustrated at 1900. The non-phase adjusted ECU synthesis $X_{\hat{R},mem}$(k) is illustrated at 1904. The ECU synthesis $X_{R,ECU}$ (m,k) after the approximate phase adjustment has been applied is illustrated at 1902. The approximate phase adjustment can be used on a band basis and/or on a per frequency bin basis.

Figure 17:
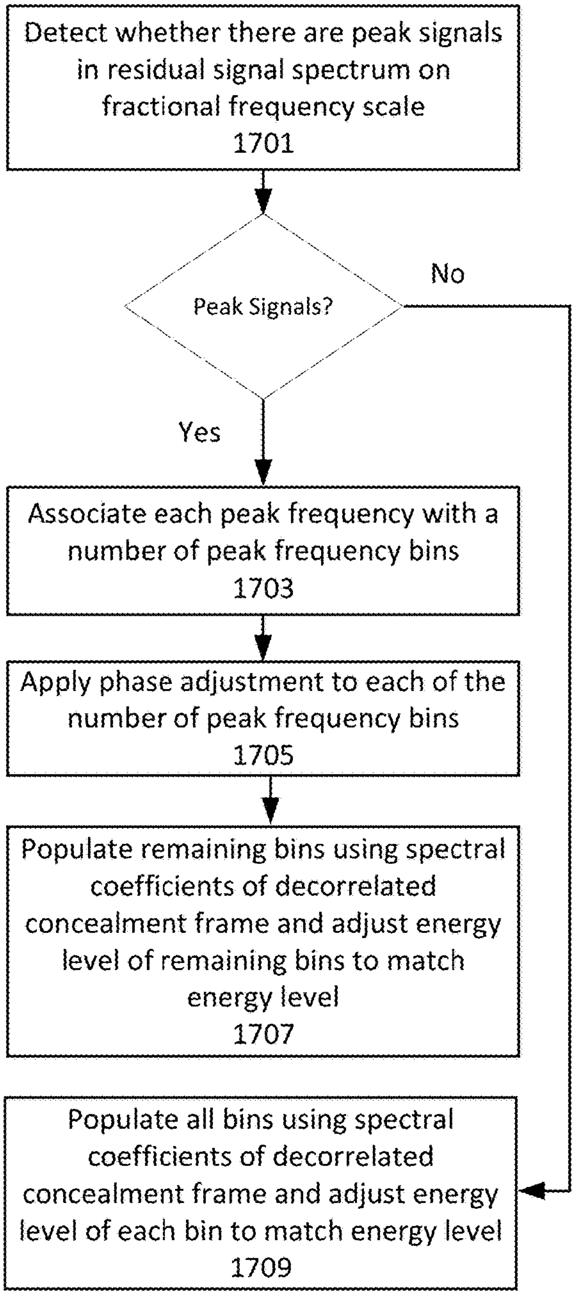

Note that if no tonal components are found, i.e. no peaks are detected, the entire concealment frame will be composed of the decorrelated concealment frame with spectral shaping applied, $X_{R,ECU}$(m,k). This is illustrated in FIG. 17. Turning to FIG. 17, in operation 1701, the decoder 100 detects whether there are peak signals in the residual signal spectrum on a fractional frequency scale. If there are peak signals, operations 1703 to 1707 are performed. Specifically, each peak frequency is associated with a number of peak frequency bins in operation 1703. Operation 1703 is similar in operation to operation 1403. In operation 1705, a phase adjustment is applied to each of the number of peak frequency bins. Operation 1705 is similar in operation to operation 1405. In operation 1707, the remaining bins are populated using spectral coefficients of the decorrelated concealment frame and the energy level of the remaining bins is adjusted to match the energy level of the noise spectrum of the residual spectrum memory. Operation 1707 is similar in operation to operation 1407. If there are no peak signals, operation 1709 is performed, which populates all bins using spectral coefficients of the decorrelated concealment frame and the energy level of the bins is adjusted to match the energy level of the noise spectrum of the residual spectrum memory.

To complete the stereo synthesis of the error concealment frame, the multi-channel parameters needs to be estimated for the lost frame. This concealment may be done with various methods, but one way that was found to give reasonable results was to just repeat the stereo parameters from the last received frame to produce the multi-channel audio substitution parameters $\hat{P}$(m).

Figure 10B:
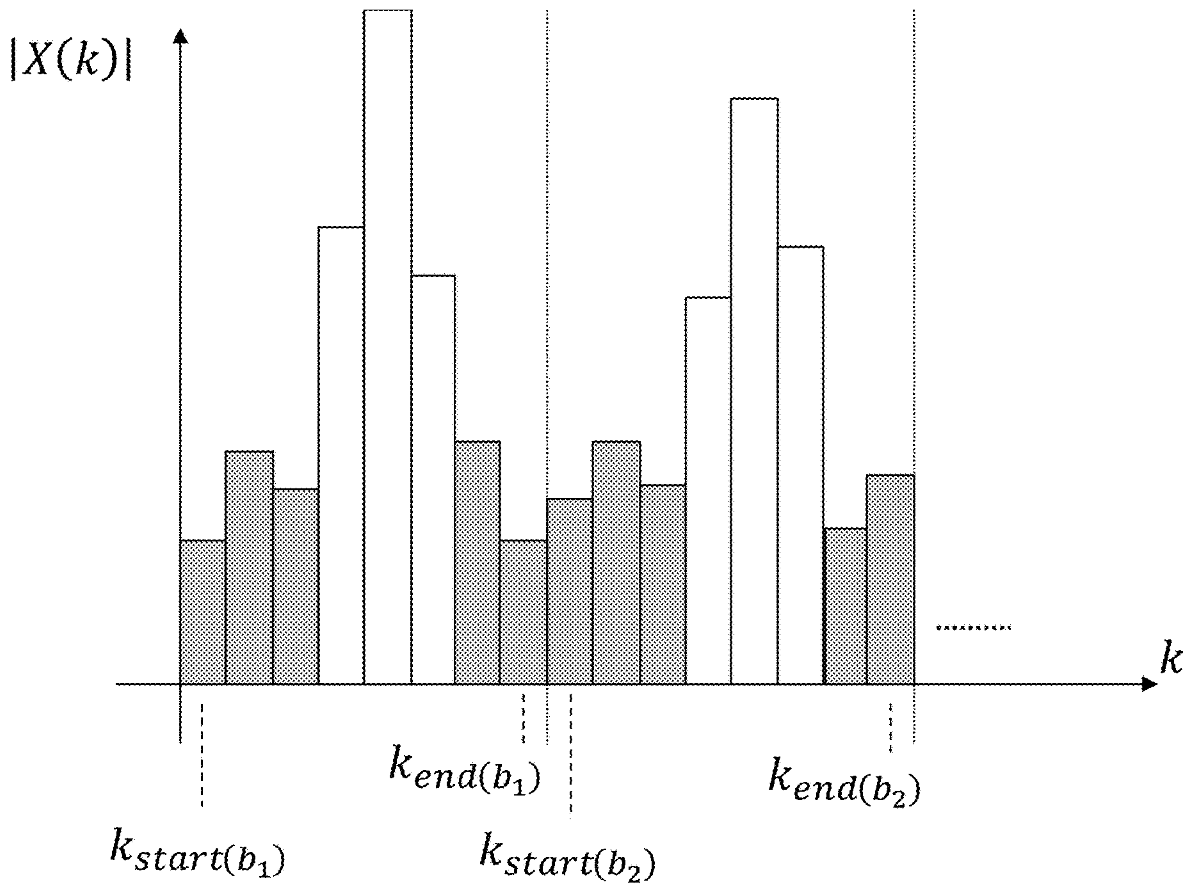

The final spectrum of the conceal residual spectrum is found by combining the spectral peaks with the energy adjusted noise spectrum in signal combiner 755. An example of the combination is illustrated in FIG. 10*b*.

Returning to FIG. 12, in operation 1211, the down-mix error concealment frame $X_{\hat{M},ECU}$(m,k), the decorrelated down-mix concealment frame $X_{D,ECU}$(m,k) and the energy adjusted decorrelated residual concealment frame $X_{R,ECU}$ (m,k) is fed together with the multichannel audio parameters $\hat{P}$(m) to the parametric synthesis block 760 to produce the reconstructed signal. After the synthesis in DFT domain has been applied, the multichannel signal is transformed to time domain (e.g., left and right channels) in operation 1213 and output from the stereo decoder.

Figure 16:
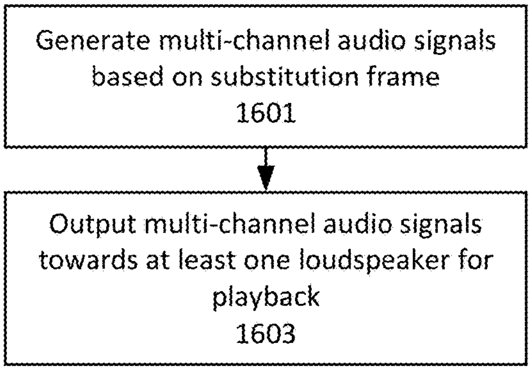

For example, in operation 1601 of FIG. 16, multichannel audio signals are generated based on the reconstructed signal (i.e., substitution frame). In operation 1603, the multichannel audio signals are output towards at least one loudspeaker for playback.

Turning to FIGS. 5-7, DFTs and IDFTs are illustrated. The IDFTs serve to decouple the down-mix decoding and the residual decoding from the DFT analysis stage. In other embodiments, the IDFTs are not used. In yet other embodiments where the signal processing described above is performed in the time domain, the DFTs are only used to provide the a decorrelated down-mix concealment frame $X_{D,ECU}$(m,k) and a residual signal spectrum $X_{\hat{R},mem}$(k) while the IDFTs are used to provide their time domain counterparts.

Figure 8:
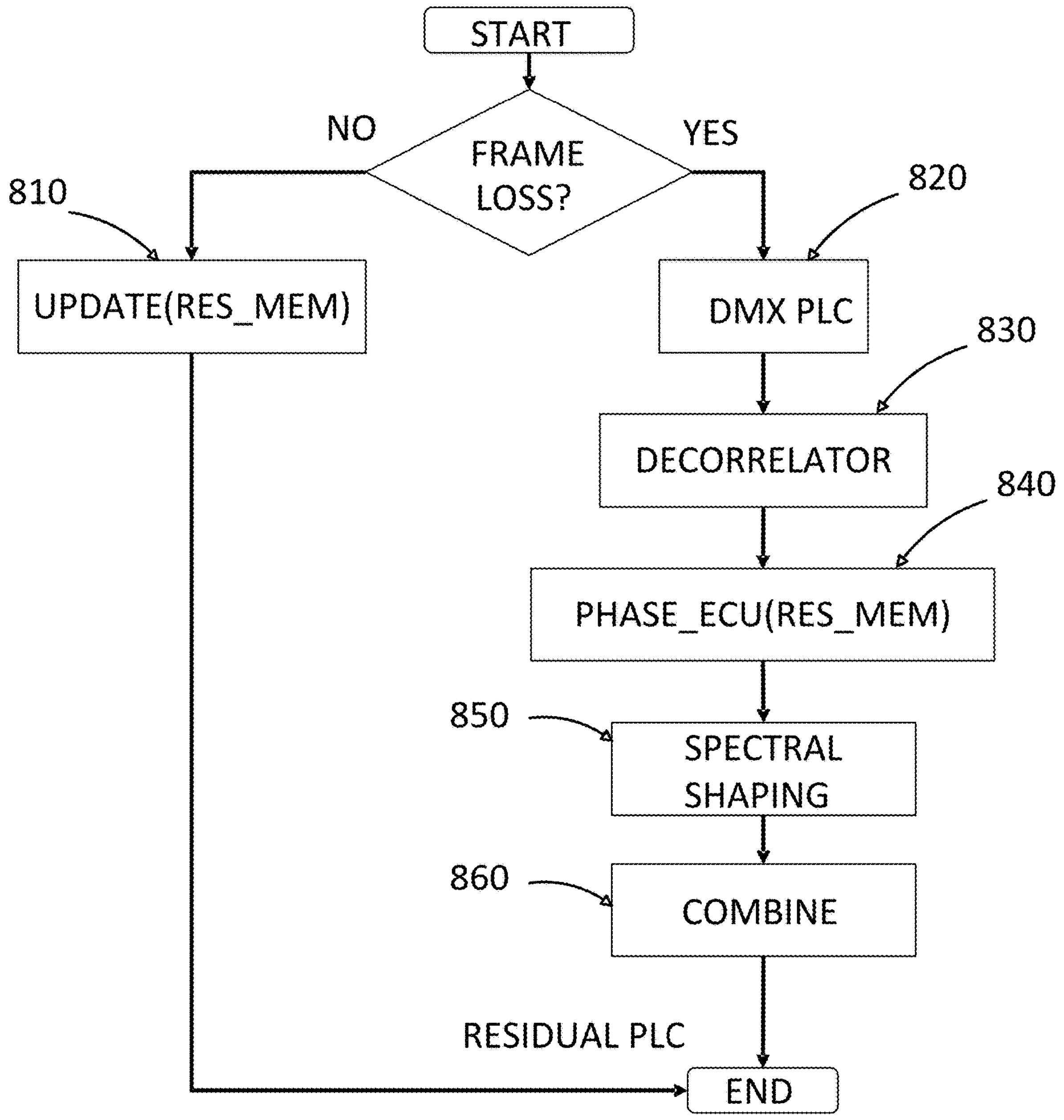
FIG. 8 is a flow chart illustrating operations of a decoder according to some embodiments of inventive concepts.
Figure 9:
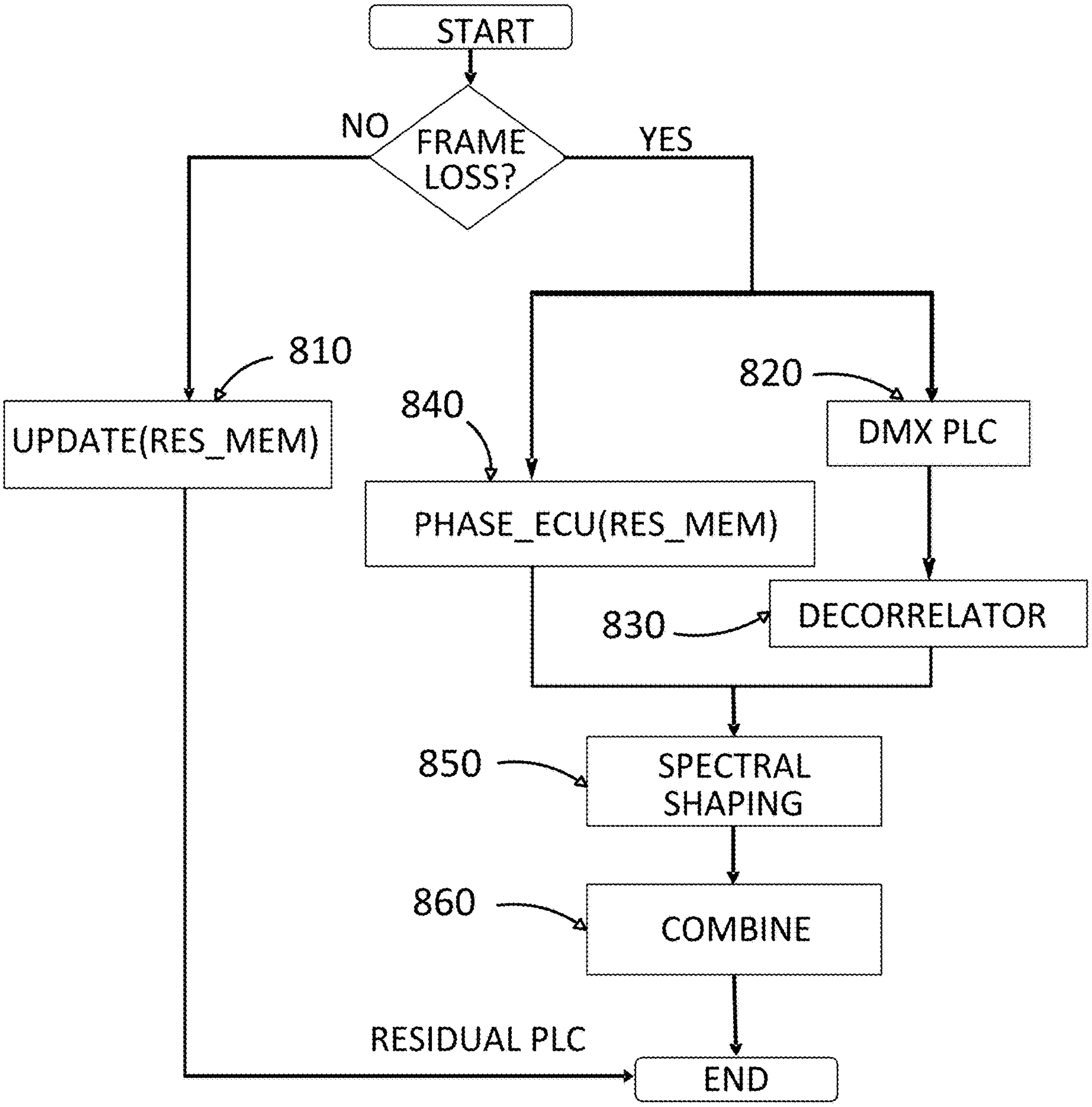
FIG. 9 is a flow chart illustrating operations of a decoder to generate a residual signal according to some embodiments of inventive concepts.

Turning, to FIGS. 8 and 9, flowcharts are illustrated depicting how the operations of concealment of residual signal of FIG. 12 may be performed in serial or in parallel. In case of an error-free frame, the DFT spectrum of the residual signal $X_{\hat{R}}$(m,k) is stored in memory and updated in every error-free frame in operation 810. This memory is later used in the concealment of the "lost frame". When the decoder detects or is notified of frame loss/corruption, the PLC algorithm, designed for down-mix part, is activated and generates the down-mix signal $\hat{M}_{ECU}$(m,n) in operation 820. PLC algorithm for down-mix can be chosen from the techniques described above. Then, $\hat{M}_{ECU}$(m,n) can be fed to the decorrelator in operation 830 to extract a non-correlated signal $X_{D,ECU}$(m,k). Decorrelation can also be carried out in time domain as well. Also, the memory of down-mix, which holds the down-mix signal of the past frame, may be included in the input to the decorrelator. Then sinusoid components of residual memory, residual from last good $X_{\hat{R},mem}(k)$, are phase shifted in operation 840. Note that operations 830 and 840 are independent from each other and can be carried out the other way around. To keep the shape of the residual signal close to the residual of last good frame, the spectrum of decorrelator signal is reshaped in operation 850 based on the residual signal of the last good frame. The phase-shifted sinusoid components of residual signal of the last good frame and the reshaped decorrelated signal are combined in operation 860 and the concealment frame for residual signal $X_{R,ECU}(m,k)$ is generated. In another embodiment, the decoder may process operations 820 and 830 in parallel with operation 840. This is illustrated in FIG. 9.

FIGS. 10A and 10B show an example of how the decorrelator signal is shaped. FIG. 10A illustrates a residual signal spectrum (labeled as prototype) and a decorrelator output. FIG. 10B illustrates a concealment frame for the residual signal $X_{R,ECU}(m,k)$ derived as described above.

Figure 18:
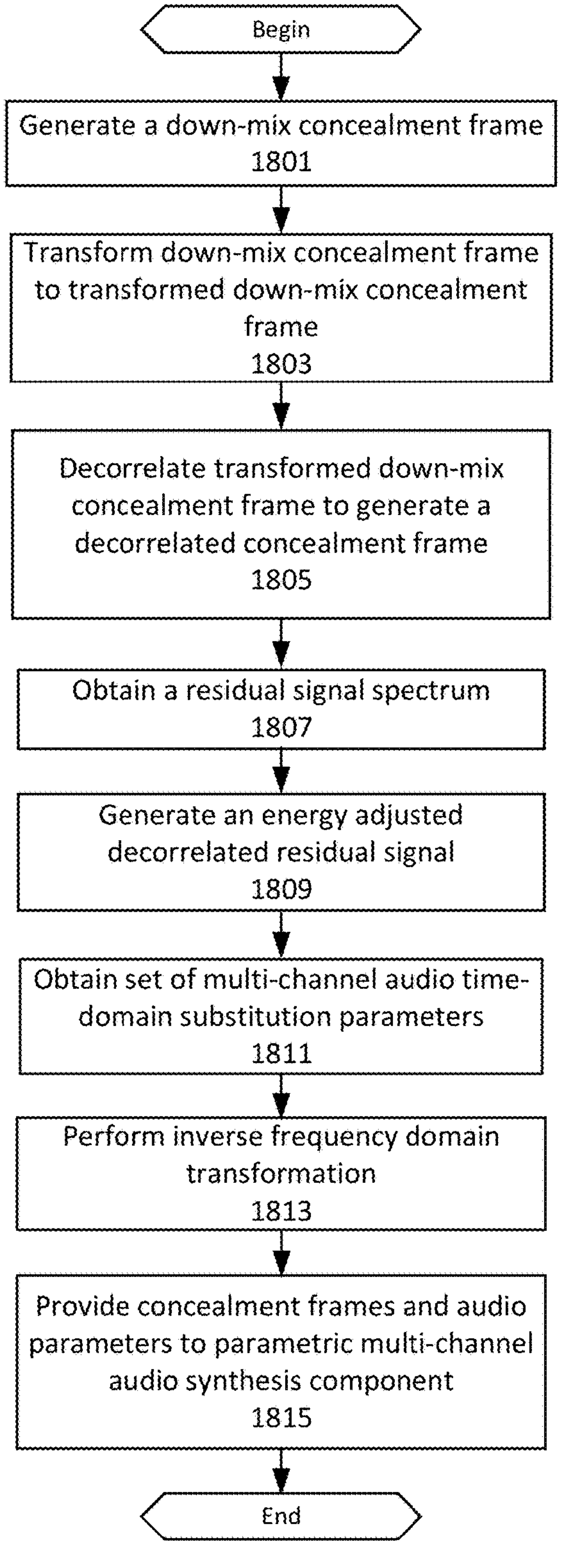

As previously indicated, the input to the parametric synthesis block 660 may alternatively be in the time domain. FIG. 18 illustrates the operation of decoder 100 when the input to the parametric synthesis block 660 is in the time domain and the parametric synthesis block synthesizes the signals in the time domain. Operations 1801 to 1811 are the same operations as operations 1201 to 1211 of FIG. 12 as described above. In operation 1813, the decoder 100 performs an inverse frequency domain (IFD) transformation on the decorrelated concealment frame and the concealment frame for the residual signal. In operation 1815, the resulting IFD transformed signals and the parametric multi-channel audio time-domain substitution parameters are provided to the multi-channel audio synthesis component 760, which generates the output channels in the time domain.

LISTING OF EMBODIMENTS

1. A method of approximating a lost or corrupted multichannel audio frame of a received multichannel audio signal in a decoding device comprising a processor, the method comprising the following operations performed by the processor:
   - generating a down-mix error concealment frame (610, 720, 820, 1201);
   - transforming the down-mix error concealment frame into a frequency domain to generate a transformed down-mix error concealment frame (1203);
   - decorrelating the transformed down-mix concealment frame to generate a decorrelated concealment frame (620, 730, 830, 1205);
   - obtaining a residual signal spectrum (1207) of a stored residual signal of a previously received multichannel audio signal frame;
   - generating an energy adjusted decorrelated residual signal concealment frame (640-660, 745-755, 850-860, 1209) using the residual signal spectrum;
   - obtaining a set of multi-channel audio substitution parameters;
   - providing (1213) the transformed down-mix error concealment frame, the energy-adjusted decorrelated residual concealment frame, and multi-channel audio substitution parameters to a parametric multi-channel audio synthesis component to generate a synthesized multichannel audio frame; and
   - performing (1215) an inverse frequency domain transformation of the synthesized multichannel audio frame to generate a substitution frame for the lost or corrupted multichannel audio frame.

2 The method of Embodiment 1 wherein the set of multi-channel audio substitution parameters is obtained by repeating the parameters from the previously received multi-channel audio signal frame.

3. The method of any of Embodiments 1-2 further comprising:
   - generating (1601) multi-channel audio signals based on the substitution frame; and
   - outputting (1603) the multi-channel audio signals towards at least one loudspeaker for playback.

4. The method of any of Embodiments 1-3 wherein obtaining the residual signal spectrum comprises retrieving the residual signal spectrum from a storage device.

5. The method of any of Embodiments 1-4 wherein generating the energy adjusted decorrelated residual signal concealment frame comprises:
   - phase-shifting peak sinusoid components (650, 750, 840, 1301) of the residual signal spectrum; and
   - adjusting (640, 745, 850, 1303) an energy of a noise spectrum of non-peak sinusoid components of the residual signal spectrum of the stored residual signal.

6. The method of any of Embodiments 1-4 wherein generating the energy adjusted decorrelated residual signal concealment frame comprises:
   - detecting peak frequencies of the residual signal spectrum (1401, 1701) of the stored residual signal on a fractional frequency scale;
   - associating (1403, 1703) each peak frequency with a number of peak frequency bins representing the peak frequency;
   - applying a phase adjustment (650, 750, 840, 1405, 1705) to each of the number of peak frequency bins according to a phase adjustment to form a residual signal concealment spectrum; and
   - populating remaining bins (1407, 1707) of the residual signal concealment spectrum using spectral coefficients of the decorrelated concealment frame and adjusting an energy level of the remaining bins to match an energy level of a noise spectrum of the residual signal spectrum.

7. The method of any of Embodiments 1-4 wherein generating the energy adjusted decorrelated residual signal concealment frame comprises:
   - detecting whether there are peak frequencies in the residual signal spectrum (650, 750, 840, 1701) of the stored residual signal on a fractional frequency scale;
   - responsive to detecting no peak frequencies in the residual signal spectrum:
     - populating (1709) each bin of the residual signal concealment spectrum using spectral coefficients of the decorrelated concealment frame and adjusting an energy level of the bins to match an energy level of a noise spectrum of the residual signal spectrum;
   - responsive to detecting peak frequencies in the residual signal spectrum:
     - associating (1703) each peak frequency with a number of peak frequency bins representing the peak frequency;
     - applying a phase adjustment (650, 750, 840, 1705) to each of the number of peak frequency bins according to a phase adjustment to form a residual signal concealment spectrum; and populating remaining bins (1707) of the residual signal concealment spectrum using spectral coefficients of the decorrelated concealment frame and adjusting an energy level of the remaining bins to match an energy level of a noise spectrum of the residual signal spectrum.

8. The method of any of Embodiments 6-7 wherein adjusting an energy level of the remaining bins to match an energy level of a noise spectrum of the residual signal spectrum comprises matching the energy level on a band basis.

9. The method of Embodiment 7 wherein a band b spans (1501) a range of bins $k_{start(b)} \ldots k_{end(b)}$ and matching the energy level comprises:

calculating (1503) an energy matching gain factor $g_b$ as $$g_b = \sqrt{\frac{\sum_{k=k_{start(b)}}^{k_{end(b)}} X_{\hat{R},mem}(k)^2}{\sum_{k=k_{start(b)}}^{k_{end(b)}} X_{D,ECU}(m,k)^2}}$$

and populating (1505) the remaining bins with an energy adjusted decorrelated residual concealment frame $$X_{R,ECU}(m,k) = g_b X_{D,ECU}(m,k),\ k \notin G_i \text{ for band } b.$$

10. The method of any of Embodiments 1-9 wherein the generating of the energy adjusted decorrelated residual signal concealment frame is performed in parallel with the transforming of the down-mix error concealment frame into the frequency domain and the decorrelating of the transformed down-mix concealment frame.

11. The method of any of Embodiments 1-10 wherein one of the transforming of the down-mix error concealment frame into the frequency domain and the decorrelating of the transformed down-mix concealment frame is performed before the other of the transforming of the down-mix error concealment frame into the frequency domain and the decorrelating of the transformed down-mix concealment frame.

12. A decoder (100) for a communication network, the decoder (100) comprising:

a processor (1101); and memory (1103) coupled with the processor, wherein the memory comprises instructions that when executed by the processor cause the processor to perform operations according to any of Embodiments 1-11.

13. A computer program comprising computer-executable instructions configured to cause a device to perform the method according to any one of Embodiments 1-11, when the computer-executable instructions are executed on a processor (1101) comprised in the device.

14. A computer program product comprising a computer-readable storage medium (1103), the computer-readable storage medium having computer-executable instructions configured to cause a device to perform the method according to any one of Embodiments 1-11 when the computer-executable instructions are executed on a processor (1101) comprised in the device.

15. An apparatus configured to approximate a lost or corrupted multichannel audio frame of a received multichannel audio signal, the apparatus comprising:

at least one processor (1101);

memory (1103) communicatively coupled to the processor, said memory comprising instructions executable by the processor, which cause the processor to perform operations comprising:

generating a down-mix error concealment frame (610, 720, 820, 1201);

transforming the down-mix error concealment frame into a frequency domain to generate a transformed down-mix error concealment frame (1203);

decorrelating the transformed down-mix concealment frame to generate a decorrelated concealment frame (620, 730, 830, 1205);

obtaining a residual signal spectrum (1207) of a stored residual signal of a previously received multichannel audio signal frame;

generating an energy adjusted decorrelated residual signal concealment frame (640-660, 745-755, 850-860, 1209) using the residual signal spectrum;

obtaining (1211) a set of multi-channel audio substitution parameters;

providing (1213) the transformed down-mix error concealment frame, the energy-adjusted decorrelated residual concealment frame, and multi-channel audio parameters from the previously received multichannel audio signal frame to a parametric multichannel audio synthesis component to generate a synthesized multichannel audio frame; and performing (1215) an inverse frequency domain transformation of the synthesized multichannel audio frame to generate a substitution frame for the lost or corrupted multichannel audio frame.

16. The apparatus of Embodiment 15 wherein the set of multi-channel audio substitution parameters is obtained by repeating the parameters from the previously received multichannel audio signal frame.

17. The apparatus of any of Embodiments 15-16 further comprising:

generating (1601) multi-channel audio signals based on the substitution frame; and outputting (1603) the multi-channel audio signals towards at least one loudspeaker for playback.

18. The apparatus of any of Embodiments 15-17 wherein obtaining the residual signal spectrum comprises retrieving the residual signal spectrum from a storage device.

19. The apparatus of any of Embodiments 15-18 wherein generating the energy adjusted decorrelated residual signal concealment frame comprises:

phase-shifting peak sinusoid components (650, 750, 840, 1301) of the residual signal spectrum; and adjusting (640, 745, 850, 1303) an energy of a noise spectrum of non-peak sinusoid components of the residual signal spectrum of the stored residual signal.

20. The apparatus of any of Embodiments 15-18 wherein generating the energy adjusted decorrelated residual signal concealment frame comprises:

detecting peak frequencies of the residual signal spectrum (1401, 1701) of the stored residual signal on a fractional frequency scale;

associating (1403, 1703) each peak frequency with a number of peak frequency bins representing the peak frequency;

applying a phase adjustment (650, 750, 840, 1405, 1705) to each of the number of peak frequency bins according to a phase adjustment to form a residual signal concealment spectrum; and populating remaining bins (1407, 1707) of the residual signal concealment spectrum using spectral coefficients of the decorrelated concealment frame and adjusting an energy level of the remaining bins to match an energy level of a noise spectrum of the residual signal spectrum.

21. The apparatus of any of Embodiments 15-18 wherein generating the energy adjusted decorrelated residual signal concealment frame comprises:

detecting whether there are peak frequencies in the residual signal spectrum (650, 750, 840, 1701) of the stored residual signal on a fractional frequency scale;

responsive to detecting no peak frequencies in the residual signal spectrum:

populating (1709) each bin of the residual signal concealment spectrum using spectral coefficients of the decorrelated concealment frame and adjusting an energy level of the bins to match an energy level of a noise spectrum of the residual signal spectrum;

responsive to detecting peak frequencies in the residual signal spectrum: associating (1703) each peak frequency with a number of peak frequency bins representing the peak frequency;

applying a phase adjustment (650, 750, 840, 1705) to each of the number of peak frequency bins according to a phase adjustment to form a residual signal concealment spectrum; and populating remaining bins (1707) of the residual signal concealment spectrum using spectral coefficients of the decorrelated concealment frame and adjusting an energy level of the remaining bins to match an energy level of a noise spectrum of the residual signal spectrum.

22. The apparatus of any of Embodiments 20-21 wherein adjusting an energy level of the remaining bins to match an energy level of a noise spectrum of the residual signal spectrum comprises matching the energy level on a band basis.

23. The apparatus of Embodiment 22 wherein a band b spans (1501) a range of bins $k_{start(b)} \ldots k_{end(b)}$ and matching the energy level comprises:

calculating (1503) an energy matching gain factor $g_b$ as $$g_b = \sqrt{\frac{\sum_{k=k_{start(b)}}^{k_{end(b)}} X_{\hat{R},mem}(k)^2}{\sum_{k=k_{start(b)}}^{k_{end(b)}} X_{D,ECU}(m,k)^2}}$$

and populating (1505) the remaining bins with an energy adjusted decorrelated residual concealment frame $$X_{R,ECU}(m,k) = g_b X_{D,ECU}(m,k),\ k \notin G_i \text{ for band } b.$$

24. An audio decoder comprising the apparatus according to any of Embodiments 14-21.

25. A decoder configured to perform operations comprising:

generating a down-mix error concealment frame (610, 720, 820, 1201);

transforming the down-mix error concealment frame into a frequency domain to generate a transformed down-mix error concealment frame (1203);

decorrelating the transformed down-mix concealment frame to generate a decorrelated concealment frame (620, 730, 830, 1205);

obtaining a residual signal spectrum (1207) of a stored residual signal of a previously received multichannel audio signal frame;

generating an energy adjusted decorrelated residual signal concealment frame (640-660, 745-755, 850-860, 1209) using the residual signal spectrum;

obtaining (1211) a set of multi-channel audio substitution parameters;

providing (1213) the transformed down-mix error concealment frame, the energy-adjusted decorrelated residual concealment frame, and multi-channel audio parameters from the previously received multichannel audio signal frame to a parametric multi-channel audio synthesis component to generate a synthesized multichannel audio frame; and performing (1213) an inverse frequency domain transformation of the synthesized multichannel audio frame to generate a substitution frame for the lost or corrupted multichannel audio frame.

26. The decoder of Embodiment 25 wherein the set of multi-channel audio substitution parameters is obtained by repeating the parameters from the previously received multichannel audio signal frame.

27. A computer program product comprising a non-transitory computer readable medium storing computer program code which when executed by at least one processor causes the at least one processor to:

generate a down-mix error concealment frame (610, 720, 820, 1201);

transform the down-mix error concealment frame into a frequency domain to generate a transformed down-mix error concealment frame (1203);

decorrelate the transformed down-mix concealment frame to generate a decorrelated concealment frame (620, 730, 830, 1205);

obtain a residual signal spectrum (1207) of a stored residual signal of a previously received multichannel audio signal frame;

generate an energy adjusted decorrelated residual signal concealment frame (640-660, 745-755, 850-860, 1209) using the residual signal spectrum;

obtaining (1211) a set of multi-channel audio substitution parameters;

provide (1213) the transformed down-mix error concealment frame, the energy-adjusted decorrelated residual concealment frame, and multi-channel audio parameters from the previously received multichannel audio signal frame to a parametric multi-channel audio synthesis component to generate a synthesized multichannel audio frame; and perform (1215) an inverse frequency domain transformation of the synthesized multichannel audio frame to generate a substitution frame for the lost or corrupted multichannel audio frame.

28. The computer program product of Embodiment 27 wherein the set of multi-channel audio substitution parameters is obtained by repeating the parameters from the previously received multi-channel audio signal frame;

29. The computer program product of any of Embodiments 27-28 wherein the non-transitory computer readable medium stores further computer program code which when executed causes the at least on processor to:

generate (1601) multi-channel audio signals based on the substitution frame; and output (1603) the multi-channel audio signals towards at least one loudspeaker for playback 30. The computer program product of any of Embodiments 27-29 wherein obtaining the residual signal spectrum comprises retrieving the residual signal spectrum from a storage device.

31. The computer program product of any of Embodiments 27-20 wherein generating the energy adjusted decorrelated residual signal concealment frame comprises:

phase-shifting peak sinusoid components (650, 750, 840, 1301) of the residual signal spectrum; and adjusting (640, 745, 850, 1303) an energy of a noise spectrum of non-peak sinusoid components of the residual signal spectrum of the stored residual signal.

32. The computer program product of any of Embodiments 27-30 wherein generating the energy adjusted decorrelated residual signal concealment frame comprises:

detecting peak frequencies of the residual signal spectrum (1401, 1701) of the stored residual signal on a fractional frequency scale;

associating (1403, 1703) each peak frequency with a number of peak frequency bins representing the peak frequency;

applying a phase adjustment (650, 750, 840, 1405, 1705) to each of the number of peak frequency bins according to a phase adjustment to form a residual signal concealment spectrum; and populating remaining bins (1407, 1707) of the residual signal concealment spectrum using spectral coefficients of the decorrelated concealment frame and adjusting an energy level of the remaining bins to match an energy level of a noise spectrum of the residual signal spectrum.

33. The computer program product of any of Embodiments 27-30 wherein generating the energy adjusted decorrelated residual signal concealment frame comprises:

detecting whether there are peak frequencies in the residual signal spectrum (650, 750, 840, 1701) of the stored residual signal on a fractional frequency scale;

responsive to detecting no peak frequencies in the residual signal spectrum:

populating (1709) each bin of the residual signal concealment spectrum using spectral coefficients of the decorrelated concealment frame and adjusting an energy level of the bins to match an energy level of a noise spectrum of the residual signal spectrum $$\left(X_{R,ECU}(m, k) = gX_{D,ECU}(m, k)\right)$$

responsive to detecting peak frequencies in the residual signal spectrum: associating (1703) each peak frequency with a number of peak frequency bins representing the peak frequency;

applying a phase adjustment (650, 750, 840, 1705) to each of the number of peak frequency bins according to a phase adjustment to form a residual signal concealment spectrum; and populating remaining bins (1707) of the residual signal concealment spectrum using spectral coefficients of the decorrelated concealment frame and adjusting an energy level of the remaining bins to match an energy level of a noise spectrum of the residual signal spectrum.

34. The computer program product of any of Embodiments 32-33 wherein adjusting an energy level of the remaining bins to match an energy level of a noise spectrum of the residual signal spectrum comprises matching the energy level on a band basis.

35. The computer program product of Embodiment 34 wherein a band b spans (1501) a range of bins $K_{start(b)} \ldots k_{end(b)}$ and matching the energy level comprises:

calculating (1503) an energy matching gain factor $g_b$ as $$g_b = \sqrt{\frac{\sum_{k=k_{start(b)}}^{k_{end(b)}} X_{\hat{R},mem}(k)^2}{\sum_{k=k_{start(b)}}^{k_{end(b)}} X_{D,ECU}(m, k)^2}}$$

and populating (1505) the remaining bins with an energy adjusted decorrelated residual concealment frame $$X_{R,ECU}(m, k) = g_b X_{D,ECU}(m, k),\ k \notin G_i \text{ for band } b.$$

36. A method of approximating a lost or corrupted multi-channel audio frame of a received multichannel audio signal in a decoding device comprising a processor, the method comprising the following operations performed by the processor:

generating a down-mix error concealment frame (610, 720, 820, 1801);

transforming the down-mix error concealment frame into a frequency domain to generate a transformed down-mix error concealment frame (1803);

decorrelating the transformed down-mix concealment frame to generate a decorrelated concealment frame (620, 730, 830, 1805);

obtaining a residual signal spectrum (810, 1807) of a stored residual signal of a previously received multi-channel audio signal frame;

generating an energy adjusted decorrelated residual signal concealment frame (640-660, 745-755, 850-860, 1809) using the residual signal spectrum;

obtaining (1811) a set of multi-channel audio substitution parameters;

performing (1813) an inverse frequency domain transformation of the transformed down-mix error concealment frame, the energy-adjusted decorrelated residual concealment frame, and multi-channel audio parameters from the previously received multichannel audio signal frame to generate a transformed down-mix error concealment time-domain frame, an energy-adjusted decorrelated residual concealment time domain frame, and multi-channel audio time domain parameters; and providing (1815) the transformed down-mix error concealment time-domain frame, the energy-adjusted decorrelated residual concealment time-domain frame, and the multi-channel audio time-domain parameters to a parametric multi-channel audio synthesis component to generate a synthesized multichannel audio substitute frame.

37. The method of Embodiment 36 wherein the set of multi-channel audio substitution parameters is obtained by repeating the parameters from the previously received multi-channel audio signal frame.

38. The method of any of Embodiments 36-37 further comprising:

generating (1601) multi-channel audio signals based on the synthesized multichannel audio substitute frame; and outputting (1603) the multi-channel audio signals towards at least one loudspeaker for playback.

39. The method of any of Embodiments 36-38 wherein generating the energy adjusted decorrelated residual signal concealment frame comprises:

phase-shifting peak sinusoid components (650, 750, 840, 1301) of the residual signal spectrum;

and adjusting an energy of a noise spectrum of non-peak sinusoid components (640, 745, 850, 1303) of the residual signal spectrum of the stored residual signal.

40. The method of any of Embodiments 36-38 wherein generating the energy adjusted decorrelated residual signal concealment frame comprises:

detecting peak frequencies of the residual signal spectrum (1401, 1701) of the stored residual signal on a fractional frequency scale;

associating (1403, 1703) each peak frequency with a number of peak frequency bins representing the peak frequency;

applying a phase adjustment (650, 750, 840, 1405, 1705) to each of the number of peak frequency bins according to a phase adjustment to form a residual signal concealment spectrum; and populating remaining bins (1407, 1707) of the residual signal concealment spectrum using spectral coefficients of the decorrelated concealment frame and adjusting an energy level of the remaining bins to match an energy level of a noise spectrum of the residual signal spectrum.

41. The method of any of Embodiments 36-38 wherein generating the energy adjusted decorrelated residual signal concealment frame comprises:

detecting whether there are peak frequencies in the residual signal spectrum (650, 750, 840, 1701) of the stored residual signal on a fractional frequency scale;

responsive to detecting no peak frequencies in the residual signal spectrum:

populating (1709) each bin of the residual signal concealment spectrum using spectral coefficients of the decorrelated concealment frame and adjusting an energy level of the bins to match an energy level of a noise spectrum of the residual signal spectrum;

responsive to detecting peak frequencies in the residual signal spectrum:

associating (1703) each peak frequency with a number of peak frequency bins representing the peak frequency;

applying a phase adjustment (650, 750, 840, 1705) to each of the number of peak frequency bins according to a phase adjustment to form a residual signal concealment spectrum; and populating remaining bins (1707) of the residual signal concealment spectrum using spectral coefficients of the decorrelated concealment frame and adjusting an energy level of the remaining bins to match an energy level of a noise spectrum of the residual signal spectrum.

42. The method of any of Embodiments 40-41 wherein adjusting an energy level of the remaining bins to match an energy level of a noise spectrum of the residual signal spectrum comprises matching the energy level on a band basis by:

designating (1501) a band b to span a range of bins $k_{start(b)} \ldots k_{end(b)}$;

calculating (1503) an energy matching gain factor $g_b$ as $$g_b = \sqrt{\frac{\sum_{k=k_{start(b)}}^{k_{end(b)}} X_{\hat{R},mem}(k)^2}{\sum_{k=k_{start(b)}}^{k_{end(b)}} X_{D,ECU}(m,k)^2}}$$

and populating (1507) the remaining bins with an energy adjusted decorrelated residual concealment frame $$X_{R,ECU}(m,k) = g_b X_{D,ECU}(m,k),\ k \notin G_i \text{ for band } b.$$

43. A computer program product comprising a non-transitory computer readable medium storing computer program code which when executed by at least one processor causes the at least one processor to:

generate a down-mix error concealment frame (1801);

transform the down-mix error concealment frame into a frequency domain to generate a transformed down-mix error concealment frame (1803);

decorrelate the transformed down-mix concealment frame to generate a decorrelated concealment frame (1805);

obtain a residual signal spectrum (1807) of a stored residual signal of a previously received multichannel audio signal frame;

generate an energy adjusted decorrelated residual signal concealment frame (1809) using the residual signal spectrum;

obtaining a set of multi-channel audio time-domain substitution parameters;

perform (1811) an inverse frequency domain transformation of the transformed down-mix error concealment frame, the energy-adjusted decorrelated residual concealment frame to generate a transformed down-mix error concealment time-domain frame and an energy-adjusted decorrelated residual concealment time domain frame; and provide (1813) the transformed down-mix error concealment time-domain frame, the energy-adjusted decorrelated residual concealment time-domain frame, and the multi-channel audio time-domain substitution parameters to a parametric multi-channel audio synthesis component to generate a synthesized multichannel audio substitute frame.

44. The computer program product of Embodiment 38 wherein the set of multi-channel audio time-domain substitution parameters is obtained by repeating the parameters from the previously received multi-channel audio signal frame.

45. An apparatus configured to approximate a lost or corrupted multichannel audio frame of a received multichannel audio signal, the apparatus comprising:

at least one processor (1101);

memory (1103) communicatively coupled to the processor, said memory comprising instructions executable by the processor, which cause the processor to perform operations comprising:

generating a down-mix error concealment frame (1801);

transforming the down-mix error concealment frame into a frequency domain to generate a transformed down-mix error concealment frame (1803);

decorrelating the transformed down-mix concealment frame to generate a decorrelated concealment frame (1805);

obtaining a residual signal spectrum (1807) of a stored residual signal of a previously received multichannel audio signal frame;

generating an energy adjusted decorrelated residual signal concealment frame (1809) using the residual signal spectrum;

obtaining (1811) a set of multi-channel audio time-domain substitution parameters;

performing (1813) an inverse frequency domain transformation of the transformed down-mix error concealment frame and the energy-adjusted decorrelated residual concealment frame to generate a transformed down-mix error concealment time-domain frame and an energy-adjusted decorrelated residual concealment time domain frame; and providing (1813) the transformed down-mix error concealment time-domain frame, the energy-adjusted decorrelated residual concealment time-domain frame, and the multi-channel audio time-domain substitution parameters to a parametric multi-channel audio synthesis component to generate a synthesized multichannel audio substitute frame.

46. The apparatus of Embodiment 39 wherein the set of multi-channel audio time-domain substitution parameters is obtained by repeating the parameters from the previously received multi-channel audio signal frame.

Explanations for abbreviations from the above disclosure are provided below.

| Abbreviation | Explanation |
|---|---|
| DFT | Discrete Fourier Transform |
| LP | Linear Prediction |
| PLC | Packet Loss Concealment |
| ECU | Error Concealment Unit |
| FEC | Frame Error Correction/Concealment |
| MDCT | Modified Discrete Cosine Transform |
| MDST | Modified Discrete Sine Transform |
| ODFT | Odd Discrete Fourier Transform |
| LTP | Long Term Predictor |
| ITD | Inter-channel Time Difference |
| IPD | Inter-channel Phase Difference |
| ILD | Inter-channel Level Difference |
| ICC | Inter-channel Coherence |
| FD | Frequency Domain |
| TD | Time Domain |
| FLC | Frame Loss Concealment |
| BFI | Bad Frame Indicator |
| QMF | Quadrature Mirror Filter bank |

Citations for references from the above disclosure are provided below.

[1]. C. Faller, "Parametric multichannel audio coding: synthesis of coherence cues," in IEEE Transactions on Audio, Speech, and Language Processing, vol. 14, no. 1, pp. 299-310, January 2006.

[2]. J. Lecomte et al., "Packet-loss concealment technology advances in EVS," 2015 IEEE International Conference on Acoustics, Speech and Signal Processing (ICASSP), Brisbane, Q L D, 2015, pp. 5708-5712.

[3]. S. Bruhn, E. Norvell, J. Svedberg and S. Sverrisson, "A novel sinusoidal approach to audio signal frame loss concealment and its application in the new evs codec standard," 2015 IEEE International Conference on Acoustics, Speech and Signal Processing (ICASSP), Brisbane, Q L D, 2015, pp. 5142-5146.

[4] Breebaart, J., Hotho, G., Koppens, J., Schuijers, E., "Background, Concept, and Architecture for the Recent MPEG Surround Standard on Multichannel Audio Compression", J. Audio Eng, Soc., Vol. 55, No. 5, May 2007.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of approximating a lost or corrupted multi-channel audio frame of a received multichannel audio signal in an audio decoder, the method comprising:

generating a down-mix error concealment frame;

transforming the down-mix error concealment frame into a frequency domain to obtain a transformed down-mix error concealment frame;

decorrelating the transformed down-mix error concealment frame to obtain a decorrelated concealment frame;

obtaining a residual signal spectrum of a previously decoded multichannel audio signal frame;

generating an energy adjusted decorrelated residual signal concealment frame using the residual signal spectrum;

obtaining a set of multi-channel audio substitution parameters;

using the transformed down-mix error concealment frame, the energy-adjusted decorrelated residual concealment frame, and multi-channel audio substitution parameters to generate a synthesized multichannel audio frame; and performing an inverse frequency domain transformation of the synthesized multichannel audio frame to generate a substitution frame for the lost or corrupted multichannel audio frame.

2. The method of claim 1, wherein the set of multichannel audio substitution parameters is obtained by repeating the parameters from the previously received multichannel audio signal frame.

3. The method of claim 1, further comprising:

generating multi-channel audio signals based on the substitution frame; and outputting the multi-channel audio signals towards at least one loudspeaker for playback.

4. The method of claim 1, wherein obtaining the residual signal spectrum comprises retrieving the residual signal spectrum from a storage device.

5. The method of claim 1, wherein generating the energy adjusted decorrelated residual signal concealment frame comprises:

phase-shifting peak sinusoid components of the residual signal spectrum; and adjusting an energy of a noise spectrum of non-peak sinusoid components of the residual signal spectrum of the stored residual signal.

6. The method of claim 1, wherein generating the energy adjusted decorrelated residual signal concealment frame comprises:

detecting peak frequencies of the residual signal spectrum of the stored residual signal on a fractional frequency scale;

associating each of the detected peak frequency with a number of neighboring frequency bins to form a group of bins representing the peak frequency;

applying a phase adjustment to each of the number of peak frequency bins; and forming a residual signal concealment spectrum using phase adjusted peak frequency bins and the energy adjusted decorrelated residual signal concealment frame.

7. The method of claim 6, wherein adjusting the energy level comprises combining a phase of bins of the decorrelated concealment frame with a magnitude of the bins of the residual signal concealment spectrum.

8. The method of claim 7, wherein combining the phase comprises applying an approximate phase adjustment by matching a sign and an order of a real component and an imaginary component of the residual signal concealment spectrum to the decorrelated concealment frame.

9. The method of claim 1, wherein generating the energy adjusted decorrelated residual signal concealment frame comprises detecting whether there are peak frequencies in the residual signal spectrum of the stored residual signal on a fractional frequency scale.

10. The method of claim 9, further comprising:

responsive to detecting no peak frequencies in the residual signal spectrum, populating each bin of the residual signal concealment spectrum using spectral coefficients of the energy adjusted decorrelated residual signal concealment frame.

11. An audio decoder configured to approximate a lost or corrupted multichannel audio frame of a received multichannel audio signal, the audio decoder comprising:

processing circuitry; and memory communicatively coupled to the processing circuitry and having instructions stored therein that are executable to cause the audio decoder to perform operations comprising:

generating a down-mix error concealment frame;

transforming the down-mix error concealment frame into a frequency domain to obtain a transformed down-mix error concealment frame;

decorrelating the transformed down-mix error concealment frame to obtain a decorrelated concealment frame;

obtaining a residual signal spectrum of a previously decoded multichannel audio signal frame;

generating an energy adjusted decorrelated residual signal concealment frame using the residual signal spectrum;

obtaining a set of multi-channel audio substitution parameters;

generating a synthesized multichannel audio frame using the transformed down-mix error concealment frame, the energy-adjusted decorrelated residual concealment frame, and multi-channel audio parameters from the previously received multichannel audio signal frame; and performing an inverse frequency domain transformation of the synthesized multichannel audio frame to generate a substitution frame for the lost or corrupted multichannel audio frame.

12. The audio decoder of claim 11, wherein the set of multi-channel audio substitution parameters is obtained by repeating the parameters from the previously received multichannel audio signal frame.

13. The audio decoder of claim 12, the operations further comprising:

generating multi-channel audio signals based on the substitution frame; and outputting the multi-channel audio signals towards at least one loudspeaker for playback.

14. The audio decoder of claim 11, wherein obtaining the residual signal spectrum comprises retrieving the residual signal spectrum from a storage device.

15. The audio decoder of claim 11, wherein generating the energy adjusted decorrelated residual signal concealment frame comprises:

phase-shifting peak sinusoid components of the residual signal spectrum; and adjusting an energy of a noise spectrum of non-peak sinusoid components of the residual signal spectrum of the stored residual signal.

16. The audio decoder of claim 11, wherein generating the energy adjusted decorrelated residual signal concealment frame comprises:

detecting peak frequencies of the residual signal spectrum of the stored residual signal on a fractional frequency scale;

associating each peak frequency with a number of peak frequency bins representing the peak frequency;

applying a phase adjustment to each of the number of peak frequency bins according to a phase adjustment to form a residual signal concealment spectrum;

populating remaining bins of the residual signal concealment spectrum using spectral coefficients of the decorrelated concealment frame; and adjusting an energy level of the remaining bins to match an energy level of a noise spectrum of the residual signal spectrum.

17. The audio decoder of claim 11, wherein generating the energy adjusted decorrelated residual signal concealment frame comprises detecting whether there are peak frequencies in the residual signal spectrum of the stored residual signal on a fractional frequency scale.

18. The audio decoder of claim 17, the operations further comprise:

responsive to detecting no peak frequencies in the residual signal spectrum, populating each bin of the residual signal concealment spectrum using spectral coefficients of the decorrelated concealment frame and adjusting an energy level of the bins to match an energy level of a noise spectrum of the residual signal spectrum.

19. The audio decoder of claim 18, the operations further comprise:

responsive to detecting peak frequencies in the residual signal spectrum:

associating each peak frequency with a number of peak frequency bins representing the peak frequency;

applying a phase adjustment to each of the number of peak frequency bins according to a phase adjustment to form a residual signal concealment spectrum; and populating remaining bins of the residual signal concealment spectrum using spectral coefficients of the decorrelated concealment frame and adjusting an energy level of the remaining bins to match an energy level of a noise spectrum of the residual signal spectrum.

20. A non-transitory computer readable medium having instructions stored therein that are executable by processing circuitry of an audio decoder to cause the audio decoder to perform operations, the audio decoder configured to approximate a lost or corrupted multichannel audio frame of a received multichannel audio signal, the operations comprising:

generating a down-mix error concealment frame;

transforming the down-mix error concealment frame into a frequency domain to obtain a transformed down-mix error concealment frame;

decorrelating the transformed down-mix error concealment frame to obtain a decorrelated concealment frame;

obtaining a residual signal spectrum of a previously decoded multichannel audio signal frame;

generating an energy adjusted decorrelated residual signal concealment frame using the residual signal spectrum;

obtaining a set of multi-channel audio substitution parameters;

generating a synthesized multichannel audio frame using the transformed down-mix error concealment frame, the energy-adjusted decorrelated residual concealment frame, and multi-channel audio parameters from the previously received multichannel audio signal frame; and performing an inverse frequency domain transformation of the synthesized multichannel audio frame to generate a substitution frame for the lost or corrupted multichannel audio frame.

21. The non-transitory computer readable medium of claim 20, wherein the set of multi-channel audio substitution parameters is obtained by repeating the parameters from the previously received multi-channel audio signal frame.

* * * * *